US010822532B2

(12) United States Patent
Rathore et al.

(10) Patent No.: US 10,822,532 B2
(45) Date of Patent: *Nov. 3, 2020

(54) SILICONE-BASED PRESSURE-SENSITIVE ADHESIVE

(71) Applicant: 3M INNOVATIVE PROPERTIES COMPANY, St. Paul, MN (US)

(72) Inventors: Jitendra S. Rathore, Woodbury, MN (US); Babu N. Gaddam, Woodbury, MN (US); George W. Griesgraber, Eagan, MN (US); Kevin M. Lewandowski, Inver Grove Heights, MN (US); Stephen B. Roscoe, Woodbury, MN (US); Payam Khodaparast, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/643,656

(22) PCT Filed: Sep. 14, 2018

(86) PCT No.: PCT/IB2018/057080
§ 371 (c)(1),
(2) Date: Mar. 2, 2020

(87) PCT Pub. No.: WO2019/064117
PCT Pub. Date: Apr. 4, 2019

(65) Prior Publication Data
US 2020/0270494 A1 Aug. 27, 2020

Related U.S. Application Data

(60) Provisional application No. 62/564,637, filed on Sep. 28, 2017.

(51) Int. Cl.
*C08F 2/46* (2006.01)
*C08F 2/50* (2006.01)
*C08G 61/04* (2006.01)
*C09J 183/04* (2006.01)
*C09J 7/38* (2018.01)
*C08G 77/20* (2006.01)
*C08K 5/38* (2006.01)
*C08K 5/40* (2006.01)

(52) U.S. Cl.
CPC ............ *C09J 183/04* (2013.01); *C08G 77/20* (2013.01); *C08K 5/38* (2013.01); *C08K 5/40* (2013.01); *C09J 7/38* (2018.01); *C09J 2301/416* (2020.08)

(58) Field of Classification Search
CPC ...... C08F 293/005; C08F 293/00; C08F 2/50; C08F 2/38; C08F 287/00; C08F 265/04; C08F 222/10; C08F 220/18; C08F 2810/20; C08F 2438/03; C09J 4/06; C09J 2433/00; C09J 11/08; C09J 2453/00; C09J 7/387; C09J 2205/102; C09J 2205/114
USPC ............... 522/6, 189, 184, 71, 1; 520/1
See application file for complete search history.

(56) References Cited

U.S. PATENT DOCUMENTS

| 4,181,752 | A | 1/1980 | Martens |
| 4,329,384 | A | 5/1982 | Vesley |
| 4,330,590 | A | 5/1982 | Vesley |
| 4,379,201 | A | 4/1983 | Heilmann |
| 5,214,119 | A | 5/1993 | Leir |
| 5,237,082 | A | 8/1993 | Leir |
| 5,264,278 | A | 11/1993 | Mazurek |
| 5,314,748 | A | 5/1994 | Mazurek |
| 5,506,279 | A | 4/1996 | Babu |
| 5,514,730 | A | 5/1996 | Mazurek |
| 5,773,485 | A | 6/1998 | Bennett |
| 5,773,836 | A | 6/1998 | Hartley |
| 7,241,437 | B2 | 7/2007 | Davidson |
| 7,371,464 | B2 | 5/2008 | Sherman |
| 7,417,099 | B2 | 8/2008 | Savu |
| 7,501,184 | B2 | 3/2009 | Leir |

(Continued)

FOREIGN PATENT DOCUMENTS

| EP | 0286376 | 10/1988 |
| EP | 0349270 | 1/1990 |

(Continued)

OTHER PUBLICATIONS

Destarac, "Madix Technology: From Innovative Concepts to Industrialization", Polymer Preprints, 2008, vol. 49, No. 02, pp. 179-180.

(Continued)

*Primary Examiner* — Jessica Whiteley
(74) *Attorney, Agent, or Firm* — Jean A. Lown

(57) ABSTRACT

Silicone-based pressure-sensitive adhesives, reaction mixtures used to form the pressure-sensitive adhesives, methods of making the silicone-based pressure-sensitive adhesives, and articles containing the silicone-based pressure-sensitive adhesives are described. More particularly, the silicone-based pressure-sensitive adhesives include silicone-based elastomeric materials that are prepared by polymerizing a silicone compound having at least two ethylenically unsaturated groups in the presence of actinic radiation (e.g., ultraviolet radiation) and a controlled radical initiator. The controlled radical initiator is a bis-dithiocarbamate or bis-dithiocarbonate compound having a single carbon between the two dithiocarbamate or dithiocarbonate groups.

14 Claims, No Drawings

(56) References Cited

U.S. PATENT DOCUMENTS

| | | |
|---|---|---|
| 7,883,652 B2 | 2/2011 | Leir |
| 7,947,376 B2 | 5/2011 | Sherman |
| 8,236,429 B2 | 8/2012 | Sherman |
| 8,492,486 B2 | 7/2013 | Sherman |
| 8,586,668 B2 | 11/2013 | Leir |
| 8,691,391 B2 | 4/2014 | Sherman |
| 8,853,323 B2 | 10/2014 | Leir |
| 9,206,290 B2 | 12/2015 | Leir |
| 9,434,821 B2 | 9/2016 | Leir |
| 2008/0187750 A1 | 8/2008 | Sherman |
| 2014/0178698 A1* | 6/2014 | Rathore .............. C09D 183/04 428/447 |
| 2015/0252235 A1 | 9/2015 | Chatterjee |
| 2020/0017727 A1* | 1/2020 | Lewandowski ............ C09J 4/06 |

FOREIGN PATENT DOCUMENTS

| | | |
|---|---|---|
| WO | WO 2009-085926 | 7/2009 |
| WO | WO 2011-119363 | 9/2011 |
| WO | WO 2015-195355 | 12/2015 |
| WO | WO 2015-195391 | 12/2015 |
| WO | WO 2019-064116 | 4/2019 |

OTHER PUBLICATIONS

Mattioni, "Prediction of Glass Transition Temperatures from Monomer and Repeat Unit Structure Using Computational Neural Networks", Journal of Chemical Information and Computer Sciences, 2002, vol. 42, No. 02, pp. 232-240.

Moad, "RAFT Polymerization—Then and Now", American Chemical Society, Chapter 12, 2015, pp. 211-246.

Otsu, "Role of Initiator-Transfer Agent-Terminator (Iniferter) in Radical Polymerizations: Polymer Design by Organic Disulfides as Iniferters", Macromolecular Chem. Rapid Communications, 1982, vol. 03, No. 02, pp. 127-132.

Taton, "Macromolecular Design by Interchange of Xanthates: Background, Design, Scope and Applications", Handbook of RAFT Polymerization, 2008, p. 373.

International Search Report for PCT International Application No. PCT/IB2018/057080, dated Dec. 10, 2018, 4 pages.

\* cited by examiner

SILICONE-BASED PRESSURE-SENSITIVE ADHESIVE

CROSS REFERENCE TO RELATED APPLICATIONS

This application is a national stage filing under 35 U.S.C. 371 of PCT/IB2018/057080, filed Sep. 14, 2018, which claims the benefit of U.S. Provisional Patent Application No. 62/564,637, filed Sep. 28, 2017, the disclosure of which is incorporated by reference herein in its/their entirety.

BACKGROUND

Silicone-based elastomeric materials have been combined with tackifying resins (including silicone tackifying resins) to prepare pressure-sensitive adhesives such as those described in U.S. Pat. No. 5,237,082 (Leir et al.), U.S. Pat. No. 5,264,278 (Mazurek et al.), U.S. Pat. No. 5,264,278 (Mazurek et al.), U.S. Pat. No. 5,314,748 (Mazurek et al.), and U.S. Pat. No. 5,514,730 (Mazurek et al.). The silicone-based elastomeric material in the pressure-sensitive adhesives have been prepared by polymerizing a silicone compound having terminal ethylenically unsaturated groups using actinic radiation (e.g., ultraviolet radiation) in the presence of conventional Norrish type-1 photoinitiators. Advantageously, this polymerization reaction can occur in the absence of organic solvents and/or in the presence of heat-sensitive materials such as a heat-sensitive substrate.

Living controlled radical polymerization methods have been developed that allow the preparation of polymers with well-defined molecular weight, polydispersity, topology, composition, and microstructure. These methods are based on the use of special polymerization mediators, which temporarily and reversibly transform propagating radicals into dormant and/or stable species. The reversible transformations are typically either accomplished by reversible deactivation or by reversible chain transfer. Some of the methods that involve living controlled radical polymerization through reversible transformations include iniferter methods, nitroxide mediated polymerization (NMP) methods, atom transfer polymerization (ATRP) methods, and reversible addition-fragmentation (RAFT) methods.

The terms "iniferter" and "photoiniferter" refer to molecules that can act as an initiator, transfer agent, and terminator. Various iniferters were discussed in Otsu et al., Macromol. Chem., Rapid Commun., 3, 127-132 (1982). The compound p-xylene bis(N,N-diethyldithiocarbamate) (XDC) has been used to form various acrylic-based block copolymers such as those described in European Patent Applications 0286376 A2 (Otsu et al.) and 0349270 A2 (Mahfuza et al.).

SUMMARY

Silicone-based pressure-sensitive adhesives, reaction mixtures used to form the pressure-sensitive adhesives, methods of making the silicone-based pressure-sensitive adhesives, and articles containing the silicone-based pressure-sensitive adhesives are described. More particularly, the silicone-based pressure-sensitive adhesives include silicone-based elastomeric materials that are prepared by polymerizing a silicone compound having at least two ethylenically unsaturated groups in the presence of actinic radiation (e.g., ultraviolet radiation) and a controlled radical initiator. The controlled radical initiator is a bis-dithiocarbamate or bis-dithiocarbonate compound having a single carbon between the two dithiocarbamate or dithiocarbonate groups.

In a first aspect, a silicone-based pressure-sensitive adhesive composition is provided. The silicone-based pressure-sensitive adhesive is a reaction product (i.e., polymerized product) of a reaction mixture containing (a) a silicone compound having at least two ethylenically unsaturated groups, (b) a photoinitiator of Formula (II),

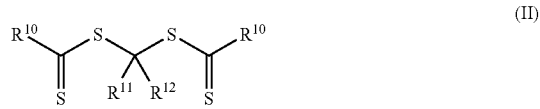

(II)

and (c) a silicone tackifying resin. In Formula (II), each $R^{10}$ is an alkoxy, aryloxy, alkaryloxy, aralkyloxy, alkenoxy, or $-N(R^{13})_2$. Group $R^{11}$ is of formula $-(OR^{14})_p-OR^{15}$ or a group of formula $-(CO)-X-R^{16}$. Group $R^{12}$ is a hydrogen, alkyl, aryl, alkaryl, aralkyl, a group of formula $-(CO)OR^{17}$, or a group of formula $-(CO)N(R^{18})_2$. Each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R^{14}$ is an alkylene. $R^{15}$ is an alkyl and $R^{16}$ is hydrogen, alkyl, aryl, aralkyl, or alkaryl. Group $R^{17}$ is an alkyl, aryl, aralkyl, or alkaryl and each $R^{18}$ is an alkyl, aryl, aralkyl, or alkaryl. Group X is oxy or $-NR^{19}-$ and group $R^{19}$ is hydrogen, alkyl, aryl, aralkyl, or alkaryl. The variable p is an integer equal to at least 0.

In a second aspect, a reaction mixture is provided. The reaction mixture is used to form a silicone-based pressure-sensitive adhesive. The reaction mixture includes (a) a silicone compound having at least two ethylenically unsaturated groups and (b) a photoinitiator of Formula (II) as described above, and (c) a silicone tackifying resin.

In a third aspect, an article is provided. The article contains a layer of a silicone-based pressure-sensitive adhesive and a substrate. The layer of the silicone-based pressure-sensitive adhesive is positioned adjacent to the substrate. The silicone-based pressure-sensitive adhesive is the same as described in the first aspect.

In a fourth aspect, a method of making a silicone-based pressure-sensitive adhesive is provided. The silicone-based pressure-sensitive adhesive contains a silicone-based elastomeric material and a silicone tackifying resin. The method includes forming a reaction mixture that contains (a) a silicone compound having at least two ethylenically unsaturated groups and (b) a photoinitiator of Formula (II) as described above, and (c) a silicone tackifying resin. The method further includes exposing the reaction mixture to actinic radiation to form the silicon-based elastomeric material.

In a fifth aspect, a silicone-based pressure-sensitive adhesive is provided. The silicone-based pressure-sensitive adhesive includes (a) a silicone elastomeric material and (b) a silicone tackifying resin. The silicone-based elastomeric material is a polymerized product of a reaction composition that includes (1) a silicone compound having at least two ethylenically unsaturated groups and (2) a photoinitiator of Formula (II) as described above.

DETAILED DESCRIPTION

Silicone-based pressure-sensitive adhesives, reaction mixtures used to form the silicone-based pressure-sensitive adhesives, methods of making the silicone-based pressure-sensitive adhesives, and articles containing the silicone-based pressure-sensitive adhesives are described. The silicone-based pressure-sensitive adhesives contain a silicone-based elastomeric material and a silicone tackifying resin.

More particularly, the silicone-based elastomeric material included in the silicone-based pressure-sensitive adhesive is prepared by polymerizing silicone compounds having at least two ethylenically unsaturated groups in the presence of actinic radiation (e.g., ultraviolet radiation) and a controlled radical initiator. The controlled radical initiator is a bis-dithiocarbamate or bis-dithiocarbonate compound having a single carbon between the two dithiocarbamate or dithiocarbonate groups. The silicone-based pressure-sensitive adhesives containing these silicone-based elastomeric materials often have improved adhesive properties (e.g., increased peel strength adhesion and/or increased shear strength) compared to known silicone-based pressure-sensitive adhesives containing silicone-based elastomeric materials that are formed by free radical polymerization reactions in the presence of a conventional Norrish type-1 photoinitiator.

The controlled radical initiator bis-dithiocarbamate or bis-dithiocarbonate compounds can be referred to as iniferters because they can function as a controlled radical initiator, transfer agent, and terminator. The controlled radical initiator compounds also can be referred to as photoinitiators or photoiniferters because the controlled radical polymerization reaction typically is photolytically induced.

The terms "a", "an", and "the" are used interchangeably with "at least one" to mean one or more of the elements being described.

The term "and/or" means either or both. For example, "A and/or B" means only A, only B, or both A and B.

The terms "silicone" and "silicone-based" are used interchangeably and refer to materials that contain one or more groups of formula —O—Si(R)$_2$—O— where R is a hydrocarbyl groups. In many embodiments, the silicone or silicone-based material has a polydiorganosiloxane group as defined below (see group $Q^1$).

The term "hydrocarbyl" refers to monovalent group that is a hydrocarbon. Examples, of hydrocarbyl groups include, but are not limited to, alkyl, aryl, aralkyl, alkaryl, and alkenyl.

The term "alkyl" refers to a monovalent group that is a radical of an alkane. The alkyl group can have 1 to 32 carbon atoms, 1 to 20 carbon atoms, 1 to 12 carbon atoms, 1 to 10 carbon atoms, 1 to 6 carbon atoms, or 1 to 4 carbon atoms. The alkyl can be linear, branched, cyclic, or a combination thereof. A linear alkyl has at least one carbon atoms while a cyclic or branched alkyl has at least 3 carbon atoms. In some embodiments, if there are greater than 12 carbon atoms, the alkyl is branched.

The term "alkoxy" refers to a monovalent group of formula —OR$^a$ where R$^a$ is an alkyl as defined above.

The term "alkylene" refers to a divalent group that is a radical of an alkane. The alkylene group can have 1 to 32 carbon atoms, 1 to 20 carbon atoms, 1 to 12 carbon atoms, 1 to 10 carbon atoms, 1 to 6 carbon atoms, or 1 to 4 carbon atoms. The alkylene can be linear, branched, cyclic, or a combination thereof. A linear alkylene has at least one carbon atoms while a cyclic or branched alkylene has at least 3 carbon atoms. In some embodiments, if there are greater than 12 carbon atoms, the alkyl is branched.

The term "alkenyl" refers to a monovalent group that is a radical of an alkene, which is a compound having at least one carbon-carbon double bond. In some embodiments, the alkenyl has a single carbon-carbon double bond. In some more specific embodiments, the alkenyl has an ethylenically unsaturated group (the carbon-carbon double bond is between the last two carbon atoms in a chain). The alkenyl has at least two carbon atoms and can have up to 20 carbon atoms, up to 16 carbon atoms, up to 12 carbon atoms, or up to 6 carbon atoms. The alkenyl can be linear, branched, or cyclic.

The term "alkenyloxy" refers to a monovalent group that is of formula —O—R$^b$ where R$^b$ is an alkenyl.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms or 6 to 10 carbon atoms.

The term "aryloxy" refers to a monovalent group that is of formula —OAr where Ar is an aryl group as defined above.

The term "aralkyl" refers to an alkyl group substituted with at least one aryl group. That is, the aralkyl group is of formula —R$^d$—Ar where R$^d$ is an alkylene and Ar is an aryl. The aralkyl group contains 6 to 40 carbon atoms. The aralkyl group often contains an alkylene group having 1 to 20 carbon atoms or 1 to 10 carbon atoms and an aryl group having 5 to 20 carbon atoms or 6 to 10 carbon atoms.

The term "aralkyloxy" refers to a monovalent group that is of formula —O—R$^d$—Ar with R$^d$ and Ar being the same as defined above for aralkyl.

The term "aralkylene" refers to a divalent group of formula —R$^d$—Ar$^a$— where R$^d$ is an alkylene and Ar$^a$ is an arylene. That is, an aralkylene is an alkylene bonded to an arylene.

The term "alkaryl" refers to an aryl group substituted with at least one alkyl group. That is, the alkaryl group is of formula —Ar$^1$—R$^e$ where Ar$^1$ is an arylene and R$^e$ is an alkyl. The alkaryl group contains 6 to 40 carbon atoms. The alkaryl group often contain an arylene group having 5 to 20 carbon atoms or 6 to 10 carbon atoms and an alkyl group having 1 to 20 carbon atoms or 1 to 10 carbon atoms.

The term "alkaryloxy" refers to a monovalent group of formula —O—Ar$^1$—R$^e$ where Ar$^1$ and R$^e$ being the same as defined above for alkaryl.

The term "haloalkyl" refers to an alkyl that is substituted with at least one halo (e.g., chloro, bromo, or fluoro). The alkyl is the same as described above.

The term "carbonyloxy" and "oxycarbonyl" are both used to refers to a divalent group —(CO)—O— or —O—(CO)—.

The term "carbonylimino" and "iminocarbonyl" are both used to refer to a divalent group —(CO)—NH— or —NH—(CO)—.

The term "oxy" refer to the divalent group —O—.

The term "imino" refers to a divalent group —NH—.

The term "ethylenically unsaturated group" refers to a group of formula $CH_2$=$CHR^f$— where R$^f$ is hydrogen or an alkyl. Example ethylenically unsaturated groups can be vinyl groups (including vinyl ether groups) and (meth)acryloyl groups.

The term "(meth)acryloyl" refers to a group of formula $CH_2=CHR^c-(CO)-$ where $R^c$ is hydrogen or methyl and the group —(CO)— refers to a carbonyl group.

The term "(meth)acrylate" refers to an acrylate, a methacrylate, or both. Likewise, the term "(meth)acrylamide" refers to an acrylamide, a methacrylamide, or both and the term "(meth)acrylic acid" refers to acrylic acid, methacrylic acid, or both.

The term "heterocyclic ring" refers to a ring structure having at least 1 heteroatom selected from oxygen, nitrogen, or sulfur, wherein the ring structure is saturated or unsaturated. The heterocyclic ring typically has 5 to 7 ring atoms and 1 to 3 heteroatoms. The heterocyclic ring can optionally be fused to one or more second rings that are carbocyclic or heterocyclic and that can be saturated or unsaturated. Any of the rings can optionally be substituted with an alkyl group.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "oxy" refers to a divalent radical of oxygen.

The terms "in a range of" or "in the range of" are used interchangeably to refer to all values within the range plus the endpoints of the range.

The term "pressure-sensitive adhesive" refers to an adhesive that possesses the following properties: (1) aggressive and permanent tack; (2) adherence to a substrate with no more than finger pressure; (3) sufficient ability to hold onto an adherend; and (4) sufficient cohesive strength to be removed cleanly from the adherend.

The silicone-based pressure-sensitive adhesive contains both a silicone-based elastomeric material and a silicone tackifying resin. The silicone-based elastomeric material included in the pressure-sensitive adhesive is formed from a reaction mixture that includes a silicone compound having at least two ethylenically unsaturated groups and a photoinitiator of Formula (II). Typically, the silicone-based elastomeric material is formed in the presence of the silicone tackifying resin. Other optional components can be included in the reaction mixture such as, for example, a silicone compound having a single ethylenically unsaturated group, a filler, and an organic solvent. The components of the reaction mixture are described below.

Silicone Compound Having at Least Two Ethylenically Unsaturated Groups

The reaction mixture used to form the pressure-sensitive adhesive contains a silicone compound that can have two, three, four, or even more ethylenically unsaturated groups. In many embodiments, the ethylenically unsaturated group is a (meth)acryloyl group or a vinyl group, which include vinyl ether groups.

The silicone compound often has two ethylenically unsaturated groups and the ethylenically unsaturated groups are at the termini of the silicone compound. Such compounds are often of Formula

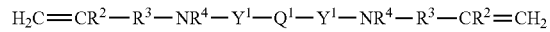
(I)

In Formula (I), $Q^1$ is a polydiorganosiloxane group and each $Y^1$ is an alkylene, arylene, aralkylene, or a combination thereof. Each $R^2$ is a hydrogen or methyl. Each $R^3$ is a single bond or is a divalent group selected from a carbonyl, carbonylimino, carbonyloxy, imino, oxy, alkylene, alkylene substituted with a hydroxyl group, aralkylene, and a combination thereof. Each $R^4$ is hydrogen or an alkyl.

The group $Q^1$ in Formula (I) is a polydiorganosiloxane group of formula

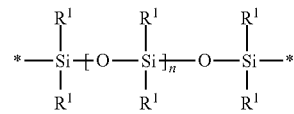

where each $R^1$ is independently an alkyl, haloalkyl, aralkyl, alkenyl, aryl, or aryl substituted with an alkyl, alkoxyl, or halo. The variable n is an integer in a range of 0 to 1500. The asterisks (*) are the location of attachment to other groups in the compound (i.e., groups $Y^1$ in the compound of Formula (I)).

Suitable alkyl groups for $R^1$ in the polydiorganosiloxane group $Q^1$ typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some polydiorganosiloxane groups, at least 50 percent of the $R^1$ groups are methyl. For example, at least 60 percent, at least 70 percent, at least 80 percent, at least 90 percent, at least 95 percent, at least 98 percent, at least 99 percent, or all the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

In many embodiments, $Q^1$ is a polydimethylsiloxane group.

Each subscript n in the polydiorganosiloxane $Q^1$ group is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

Each $Y^1$ in Formula (I) is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein for group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms. In some specific compounds of Formula (I), the group $Y^1$ is an alkylene such as, for example, propylene.

Each $R^3$ is a single bond or is a divalent group that is a carbonyl, carbonylimino, carbonyloxy, imino, oxy, alkylene, alkylene substituted with a hydroxyl group, aralkylene, or a combination thereof. Suitable alkylene, aralkylene, and combinations thereof are the same as defined in group $Y^1$.

Each $R^4$ is hydrogen or an alkyl such as an alkyl having 1 to 10 carbon atoms, 1 to 6 carbon atoms, or 1 to 4 carbon atoms.

The silicone compound having at least two ethylenically unsaturated groups often has a weight average molecular weight in a range of 500 Daltons (Da) to 200,000 Da. The weight average molecular weight can be at least 750 Da, at least 1,000 Da, at least 2,000 Da, at least 5,000 Da, at least 10,000 Da, or at least 20,000 Da. The weight average molecular weight can be up to 175,000 Da, up to 150,000 Da, up to 125,000 Da, up to 100,000 Da, up to 75,000 Da, up to 70,000 Da, up to 60,000 Da, or up to 50,000 Da. In some embodiments, the molecular weight is in a range of 1,000 to 150,000 Da, in a range of 2,000 to 125,000 Da, in a range of 3,000 to 100,000 Da, in a range of 4,000 to 75,000 Da, or in a range of 5,000 to 70,000 Da.

There are various methods that can be used to prepare the silicone compound having at least two ethylenically unsaturated groups such as those of Formula (I). In many embodiments, a polydiorganosiloxane diamine of formula $HR^4N-Y^1-Q^1-Y^1-NR^4H$ is reacted with an ethylenically unsaturated reagent compound. The groups $R^4$, $Y^1$ and $Q^1$ are the same as defined above. The ethylenically unsaturated reagent compound has (a) a group that reacts with a primary and/or secondary amine group ($-NR^4H$) and (b) an ethylenically unsaturated group. The group that reacts with a primary and/or secondary amine group is often a isocyanato group (—NCO), an ester group (—(CO)—O—), an anhydride group (—(CO)—O—(CO)—), or a oxirane group.

reagent compound with a polydiorganosiloxane diamine is shown in Reaction Scheme A.

Reaction Scheme A

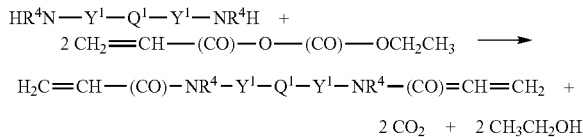

The resulting compound is of Formula (I) where $R^2$ is hydrogen and $R^3$ is a carbonyl group. In many examples, $Y^1$ is propylene, $R^4$ is hydrogen, and $Q^1$ is a polydimethylsiloxane.

In a method, the ethylenically unsaturated reagent compound has (a) an acid chloride group and (b) a (meth)acryloyloxy group. For example, the ethylenically unsaturated reagent compound can be (meth)acryloyl acid chloride. The reaction of this ethylenically unsaturated reagent compound with a polydiorganosiloxane diamine is shown in Reaction Scheme B.

Reaction Scheme B

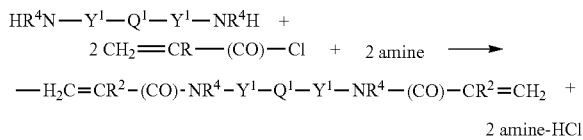

An amine such as a trialkylamine or pyridine is present to neutralize the hydrochloric acid that is generated. The resulting compound is of Formula (I) where $R^2$ is hydrogen or methyl and $R^3$ is a carbonyl group. In many examples, $Y^1$ is propylene, $R^4$ is hydrogen, and $Q^1$ is a polydimethylsiloxane.

In another method, the ethylenically unsaturated reagent compound that is reacted with a polydiorganosiloxane diamine has (a) a carbonyloxy group and (b) a vinyl group. In one example, the ethylenically unsaturated reagent compound is a vinyl azlactone. The reaction of this ethylenically unsaturated reagent compound with a polydiorganosiloxane diamine is shown in Reaction Scheme C.

Reaction Scheme C

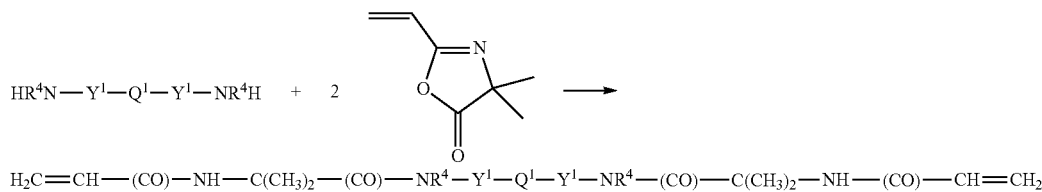

In one method, the ethylenically unsaturated reagent compound has (a) an anhydride group and (b) a (meth)acryloyloxy group. For example, the ethylenically unsaturated reagent compound can be acryloyl ethyl carbonic anhydride. The reaction of this ethylenically unsaturated The resulting compound is of Formula (I) where $R^2$ is hydrogen and $R^3$ is —(CO)—NH—C(CH$_3$)$_2$—(CO)—, which is a combination of carbonylimino, alkylene, and carbonyl groups. In many examples, $Y^1$ is propylene, $R^4$ is hydrogen, and $Q^1$ is a polydimethylsiloxane.

In still another method, the ethylenically unsaturated reagent compound has (a) an isocyanato (—NCO) group and (b) a (meth)acryloyloxy group. For example, the ethylenically unsaturated compound is 2-isocyanatoethyl methacrylate. The reaction of this ethylenically unsaturated reagent compound with a polydiorganosiloxane diamine is shown in Reaction Scheme D.

Reaction Scheme D

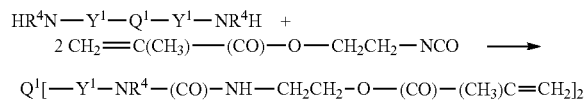

The resulting compound is of Formula (I) where $R^2$ is methyl and $R^3$ is —(CO)—O—$CH_2CH_2$—NH—(CO)—, which is a combination of carbonyloxy, alkylene, and carbonylimino groups. In many examples, $Y^1$ is propylene, $R^4$ is hydrogen, and $Q^1$ is a polydimethylsiloxane.

In yet another method, the ethylenically unsaturated reagent compound has (a) an isocyanato (—NCO) group and (b) a vinyl group. For example, the ethylenically unsaturated compound is 3-isorpenyl-α-α-dimethylbenzyl isocyanate. The reaction of this ethylenically unsaturated reagent compound with a polydiorganosiloxane diamine is shown in Reaction Scheme E where Ph is phenylene.

This compound is of Formula (I) where $R^3$ is —(CO)—O—$CH_2$—CH(OH)—$CH_2$—, which is a combination of carbonyloxy and an alkylene substituted with a hydroxyl group. In many examples, $Y^1$ is propylene, $R^4$ is hydrogen, and $Q^1$ is a polydimethylsiloxane.

The polydiorganosiloxane diamines of formula $HR^4N$—$Y^1$-$Q^1$-$Y^1$—$NR^4H$ can be formed using methods such as those described, for example, in U.S. Pat. No. 5,314,748 (Mazurek et al.), U.S. Pat. No. 5,514,730 (Mazurek et al.), U.S. Pat. No. 5,237,082 (Leir et al.), and U.S. Pat. No. 5,264,278 (Mazurek et al.).

Polydiorganosiloxane diamines also are commercially available from Gelest, Inc. (Morrisville, Pa., USA) under the trade designations DMS-A11 (molecular weight 850 to 900 Da), DMS-A32 (molecular weight about 30,000 Da), and DMS-A35 (molecular weight about 50,000 Da) and from Wacker Chemicals Corp. (New York, N.Y., USA) under the trade designations WACKER FLUID (e.g., WACKER FLUID NH 130 D (molecular weight 9,500 to 12,000 Da), NH 30 D (molecular weight 2400 to 3400 Da), and NH 15 D (950 to 1200 Da)).

In many embodiments, the polydiorganosiloxanes are aminopropyl terminated polydimethylsiloxanes. That is, $Y^1$ is equal to propylene and each $R^1$ is methyl in the polydiorganosiloxane group $Q^1$ of the compounds of formula $HR^4N$—$Y^1$-$Q^1$-$Y^1$—$NR^4H$ (i.e., $Q^1$ is a polydimethylsiloxane). Often, group $R^4$ is hydrogen (i.e., the aminopropyl terminated polydimethylsiloxanes have two primary amino groups).

Reaction Scheme E

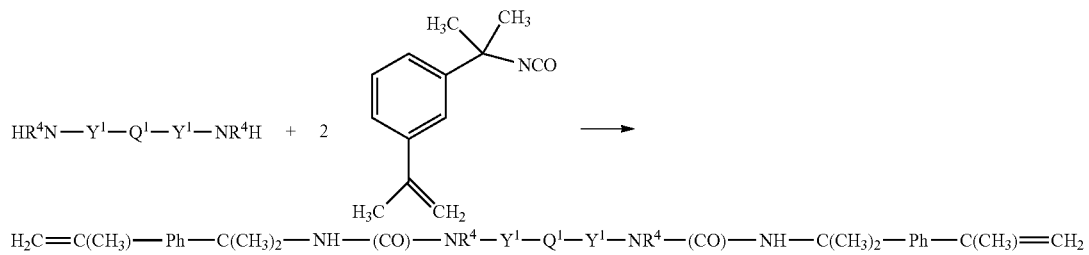

This compound is of Formula (I) where $R^2$ is methyl and $R^3$ is -Ph-C(CH$_3$)$_2$—NH—(CO)—, which is a combination of aralkylene and carbonylimino groups. In many examples, $Y^1$ is propylene, $R^4$ is hydrogen, and $Q^1$ is a polydimethylsiloxane.

In yet another method, the ethylenically unsaturated reagent compound has (a) an oxirane group and (b) a (meth)acryloyloxy group. One such ethylenically unsaturated compound is glycidyl (meth)acrylate. The reaction of this ethylenically unsaturated reagent compound with a polydiorganosiloxane diamine is shown in Reaction Scheme F.

Polydiorganosiloxanes with two terminal (meth)acrylyol groups are commercially available from Gelest, Inc. under the trade designations DMS-U21 ((3-acryloxy-2-hydroxypropoxypropyl) terminated polydimethylsiloxane with molecular weight in the range of 600 to 900 Da), DMS-R11 (methacryloxypropyl terminated dimethylsiloxane with molecular weight of 900 to 1200 Da), DMS-R18 (methacryloxypropyl terminated dimethylsiloxane with molecular weight of 4,500 to 5,500 Da), DMS-R22 (methacryloxypropyl terminated dimethylsiloxane with molecular weight of about 10,000 Da), and DMS-R31 (methacryloxypropyl terminated dimethylsiloxane with molecular weight of about Reaction Scheme F

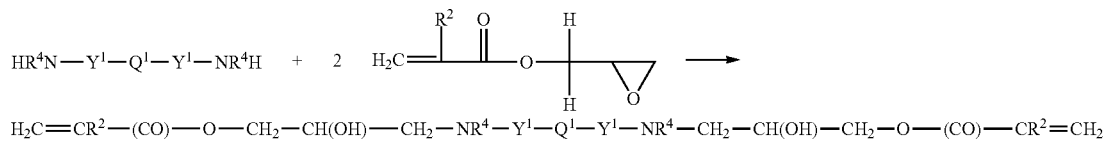

25,000 Da). Other polydiorganosiloxanes with at least two (meth)acryloyl groups are available from Evonik Corp. (Richmond, Va., USA) under the trade designations TEGO (e.g., TEGO RC 711, RC 902, and RC 715, which are acrylated terminated silicones that have various molecular weights) and from Siltech Corporation, Toronto, Ontario (Canada) under the trade designation SILMER (e.g., SILMER ACR D208, ACR Di-50, ACR Di-1508, ACR Di-2510, ACR Di-4515-O, ACR Di-10, OH ACR Di-10, OH ACR Di-50, OH ACR Di-100, OH ACR Di-400, and OH ACR C50.

The reaction mixture used to prepare the silicone-based pressure-sensitive adhesive often contains at least 30 weight percent of the silicone compound having at least two ethylenically unsaturated groups. If the amount is too low, the pressure-sensitive adhesive might not be sufficiently elastomeric. The amount is often at least 35 weight percent, at least 40 weight percent, at least 45 weight percent, at least 50 weight percent, or at least 55 weight percent. The amount can be up to 80 weight percent, up to 75 weight percent, up to 70 weight percent, up to 65 weight percent, up to 60 weight percent, or up to 55 weight percent, up to 90 weight percent, up to 85 weight percent, or up to 80 weight percent. These amounts are based on the solid content of the reaction mixture (i.e., the amounts do not consider any organic solvent that may be added).

Optional Silicone Compound Having a Single Ethylenically Unsaturated Group

A silicone compound having a single ethylenically unsaturated group optionally can be included in the reaction mixture in addition to the silicone compound having at least two ethylenically unsaturated groups. The addition of the silicone compound having a single ethylenically unsaturated group can increase the tackiness and/or flexibility of the resulting pressure-sensitive adhesive.

Silicones having a single ethylenically unsaturated group can be prepared in a similar manner to the methods described above for preparing the silicone compound having at least two ethylenically unsaturated groups. Rather than reacting a silicone compound having at least two amino groups with the ethylenically unsaturated reagent compound, a silicone compound having a single amino group is used.

The silicone compound having a single amino group is often of Formula (III).

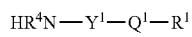

The corresponding silicone compound having a single ethylenically unsaturated group is often of Formula (IV).

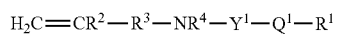

As in Formula (I), $R^1$ is an alkyl, haloalkyl, aralkyl, alkenyl, aryl, or aryl substituted with an alkyl, alkoxyl, or halo; $Q^1$ is a polydiorganosiloxane group; each $Y^1$ is an alkylene, arylene, aralkylene, or a combination thereof, each $R^2$ is a hydrogen or methyl; each $R^3$ is a single bond or is a divalent group that is a carbonyl, carbonylimino, carbonyloxy, imino, oxy, alkylene, alkylene substituted with a hydroxyl group, aralkylene, or a combination thereof; and each $R^4$ is hydrogen or an alkyl.

The weight average molecular weight (e.g., weight average molecular weight) of the silicone compound having a single ethylenically unsaturated group is often in a range of 500 to 30,000 Da. The molecular weight can be at least 750 Da, at least 1000 Da, at least 1500 Da, at least 2000 Da, at least 5000 Da, at least 7500 Da, or at least 10,000 Da. The weight average molecular weight can be up to 30,000 Da, up to 25,000 Da, up to 20,000 Da, up to 15,000 Da, up to 12,000 Da, up to 10,000 Da, up to 7500 Da, or up to 5000 Da. The molecular weight can be, for example, in a range of in a range of 1000 to 20,000 Da, in a range of 2000 to 20,000 Da, in a range of 5000 to 25,000 Da, in a range of 10,000 to 20,000 Da, in a range of 1000 to 15,000 Da, in a range of 1000 to 10,000 Da, or in a range of 1000 to 5000 Da.

Silicones having a single amino group are commercially available from Gelest, Inc. (Morrisville, Pa., USA) under the trade designation MCR-A11 (molecular weight is in a range of 800 to 1,200 Da) and MCR-A12 (molecular weight about 2,000 Da). These compounds are mono-aminopropyl terminated polydimethylsiloxanes. That is, $R^1$ is methyl, $R^4$ is hydrogen, and $Y^1$ is propylene.

Silicones having a single ethylenically unsaturated group are commercially available from Gelest, Inc. under the trade designation MCR-M11 (molecular weight is in a range of 800 to 1000 Da), MCR-M17 (molecular weight about 5000 Da), and MCR-M22 (molecular weight about 10,000 Da).

The amount of silicone compound having a single ethylenically unsaturated group in the reaction mixture used to form the silicone-based pressure-sensitive adhesive is in a range of 0 to 25 weight percent. If added, the amount is often at least 1 weight percent, at least 2 weight percent, at least 3 weight percent, at least 5 weight percent, or at least 10 weight percent. The amount can be up to 25 weight percent, up to 20 weight percent, up to 15 weight percent, or up to 10 weight percent. The amount can be in a range of 1 to 25 weight percent, 5 to 25 weight percent, 10 to 25 weight percent, 0 to 20 weight percent, 1 to 20 weight percent, 5 to 20 weight percent, 10 to 20 weight percent, 0 to 15 weight percent, 1 to 15 weight percent, 5 to 15 weight percent, 0 to 10 weight percent, or 1 to 10 weight percent. The amount is based on the solids content of the reaction mixture.

Photoinitiator

The reaction mixture used to form the pressure-sensitive adhesive also includes a photoinitiator of Formula (II).

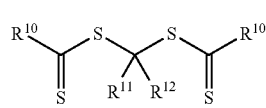

In Formula (II), each $R^{10}$ is an alkoxy, aryloxy, alkaryloxy, aralkyloxy, alkenoxy, or $-N(R^3)_2$. Group $R^{11}$ is of formula $-(OR^4)_p-OR^{15}$ with the variable p being an integer equal to at least 0 or $R^{11}$ is a group of formula $-(CO)-X-R^6$. Group $R^{12}$ is a hydrogen, alkyl, aryl, alkaryl, aralkyl, a group of formula $-(CO)OR^7$, or a group of formula $-(CO)N(R^{18})_2$. Each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R^{14}$ is an alkylene. $R^{15}$ is an alkyl and $R^{16}$ is hydrogen, alkyl, aryl, aralkyl, or alkaryl. Group $R^7$ is an alkyl, aryl, aralkyl, or alkaryl and each $R^{18}$ is an alkyl, aryl, aralkyl, or alkaryl. Group X is oxy or —$NR^{19}$—. Group $R^{19}$ is hydrogen, alkyl, aryl, aralkyl, or alkaryl.

In some embodiments of Formula (II), group $R^0$ is an alkoxy, aryloxy, aralkyloxy, alkaryloxy, or alkenoxy. Suitable alkoxy groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkoxy groups have 1 to 20 carbon atoms, 1 to 10 carbon atoms, 2 to 10 carbon atoms, 1 to 6 carbon atoms, 2 to 6 carbon atoms, or 1 to 4 carbon atoms. Suitable aryloxy groups typically have an aryl group with 5 to 12 carbon atoms, 6 to 12 carbon atoms, or 6 to 10 carbon atoms. In many embodiments, the aryl group is phenyl. Suitable aralkyloxy groups contain an aralkyl group with an alkyl group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyl group is often phenyl. The arylene group in the alkaryl group is often phenylene or biphenylene. Suitable alkaryloxy groups contain an alkaryl group having an arylene group with 5 to 12 carbon atoms, 6 to 12 carbon atoms, or 6 to 10 carbon atoms and an alkyl group with 1 to 10 carbon atoms, 1 to 6 carbon atoms, or 1 to 4 carbon atoms. The arylene group in the alkaryl group is often phenylene or biphenylene. Suitable alkenoxy groups typically have at least 2 carbon atoms, at least 3 carbon atoms, or at least 4 carbon atoms and can have up to 20 carbon atoms, up to 18 carbon atoms, up to 16 carbon atoms, up to 12 carbon atoms, up to 10 carbon atoms, or up to 6 carbons. Some example alkenoxy groups have 2 to 20 carbon atoms, 2 to 10 carbon atoms, 2 to 8 carbon atoms, 2 to 6 carbon atoms, or 2 to 4 carbon atoms.

In other embodiments of Formulas (II), group $R^{10}$ is of formula —$N(R^{13})_2$. Each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated (e.g., partially or fully unsaturated) and optionally fused to one or more second rings that are carbocyclic or heterocyclic. Suitable alkyl groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. When the formula —$N(R^{13})_2$ forms a first heterocyclic ring, the heterocyclic ring typically has a first ring structure with 5 to 7 ring members or 5 to 6 ring members and with 1 to 3 heteroatoms or 1 to 2 heteroatoms in the ring. If there is one heteroatom in the first ring structure, the heteroatom is nitrogen. If there are two or three heteroatoms in the first ring structure, one heteroatom is nitrogen and the any additional heteroatom is selected from nitrogen, oxygen, and sulfur. The first ring optionally can be fused to one or more second rings structure that are heterocyclic or carbocyclic and saturated or unsaturated (e.g., partially or fully unsaturated). If the second ring structure is heterocyclic, it typically has 5 to 7 or 5 to 6 ring members and 1, 2, or 3 heteroatoms selected from nitrogen, oxygen, and sulfur. If the second ring structure is carbocyclic, it is often benzene or a saturated ring having 5 or 6 ring members. In many embodiments, the heterocyclic ring has a single ring structure with 5 or 6 ring members and with either 1 or 2 heteroatoms in the ring. Examples of heterocyclic rings include, but are not limited to, morpholino, thiomorpholino, pyrrolidinyl, piperidinyl, homo-piperidinyl, indolyl, carbazolyl, imidazolyl, and pyrazolyl.

In many embodiments, $R^{10}$ is a group is an alkoxy or a group of formula —$N(R^{13})_2$ where each $R^{13}$ is an alkyl.

In some embodiments of Formula (II), group $R^{11}$ is of formula —$(OR^{14})_p$—$OR^{15}$. In formula —$(OR^{14})_p$—$OR^{15}$, the variable p is an integer equal to at least 0. Stated differently, $R^{11}$ forms an ether or polyether group with the carbon atom to which it is attached (i.e., the carbon atom between the two dithiocarbamate or dithiocarbonate groups). In many embodiments, p is equal to 0, at least 1, at least 2, or at least 3 and up to 20 or more, up to 10, up to 8, up to 6, up to 4, or up to 2. For example, p can be in a range of 0 to 20, 0 to 10, 0 to 6, 0 to 4, or 0 to 2. When p is equal to 0, $R^{11}$ is equal to a group of formula —$OR^{15}$. Group $R^{15}$ is an alkyl. Group $R^{14}$, if present, is an alkylene. Suitable alkyl and alkylene groups for $R^{14}$ and $R^{15}$ typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl and alkylene groups have 1 to 20 carbon atoms, 1 to 10 carbon atoms, 2 to 10 carbon atoms, 1 to 6 carbon atoms, 2 to 6 carbon atoms, or 1 to 4 carbon atoms.

In other embodiments of Formula (II), group $R^{11}$ is of formula —(CO)—X—$R^{16}$ where $R^{16}$ is hydrogen, alkyl, aryl, aralkyl, or alkaryl and where X is oxy or —$NR^{19}$— with $R^{19}$ being hydrogen, alkyl, aryl, aralkyl, or alkaryl. That is, $R^{11}$ is an ester or amide group. When $R^{16}$ and/or $R^{19}$ is an alkyl, the alkyl group typically has at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. When $R^{16}$ and/or $R^{19}$ is an aryl, the aryl often has 5 to 12 carbon atoms, 6 to 12 carbon atoms, or 6 to 10 carbon atoms. The aryl is often phenyl. When $R^{16}$ and/or $R^{19}$ is an alkaryl, the alkaryl group often contains an arylene group having 5 to 12 carbon atoms, 6 to 12 carbon atoms, or 6 to 10 carbon atoms and an alkyl group having 1 to 10 carbon atoms, 1 to 6 carbon atoms, or 1 to 4 carbon atoms. The arylene group in the alkaryl group is often phenylene or biphenylene. When $R^{16}$ and/or $R^{19}$ is an aralkyl, the aralkyl group often contains an alkyl group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyl group is often phenyl.

In many embodiments, $R^{11}$ is an alkoxy group (—$OR^{15}$) or a group of formula —(CO)—X—$R^{16}$ where $R^{16}$ is an alkyl.

Group $R^{12}$ is a hydrogen, alkyl, aryl, aralkyl, alkaryl, a group of formula —(CO)$OR^{17}$, or a group of formula —(CO)$N(R^{18})_2$. Groups $R^{17}$ and $R^{18}$ are each an alkyl, aryl, aralkyl, alkaryl. In many embodiments, group $R^{12}$ is hydrogen. Where $R^{12}$ and/or $R^{17}$ and/or $R^{18}$ is an alkyl, the alkyl group typically has at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. When $R^{12}$ and/or $R^{17}$ and/or $R^{18}$ is an aryl, the aryl often has 5 to 12 carbon atoms, 6 to 12 carbon atoms, or 6 to 10 carbon atoms. The aryl is often phenyl. When $R^{12}$ and/or $R^{17}$ and/or $R^{18}$ is an alkaryl, the alkaryl group often contains an arylene group having 5 to 12 carbon atoms, 6 to 12 carbon atoms, or 6 to 10 carbon atoms and an alkyl group having 1 to 10 carbon atoms, 1 to 6 carbon atoms, or 1 to 4 carbon atoms. The arylene group in the alkaryl group is often phenylene or biphenylene. When $R^{12}$ and/or $R^{17}$ and/or $R^{18}$ is an aralkyl, the aralkyl group often contains an alkyl group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyl group is often phenyl. In many embodiments, $R^{12}$ is hydrogen.

In many embodiments, $R^{12}$ is hydrogen.

The compound of Formula (II) can be formed using any suitable method. One such method is shown in Reaction Scheme G for compounds where $R^{11}$ is of formula $-(OR^{14})_p-OR^5$. In many such compounds, p is zero and $R^{11}$ is $-OR^{15}$ Reaction Scheme G

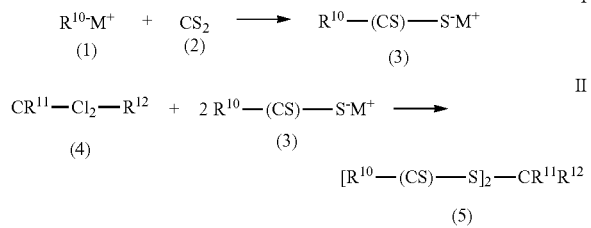

In reaction II, a compound of formula (4) is reacted with a compound of formula (3) to prepare the compound of formula (5), which corresponds to Formula (II) above. Reaction II is typically conducted at temperatures between about 0° C. and about 80° C. in the presence of an organic solvent such as acetone, acetonitrile, or an alcohol. The compound of formula (3) can be formed, for example, by treating a salt of formula (1) with carbon disulfide (Reaction I). Compound (1) is a salt of an alkoxide, aryloxide, or amine where M+ is an alkali metal, a tetralkyl ammonium ion, a trialkyl ammonium ion, or a dialkylammonium ion.

In some examples of Reaction Scheme G, compound (4) is reacted with commercially compound (3). Commercially available examples of compound (4) include, but are not limited to, dichloromethyl methyl ether, dichloromethyl butyl ether, methyl dichloromethoxyacetate. Commercially available examples of compound (3) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

Another method is shown in Reaction Scheme H for compounds where $R^{11}$ is an amide or ester group of formula $-(CO)-X-R^{16}$ and $R^{12}$ is hydrogen.

Reaction Scheme H

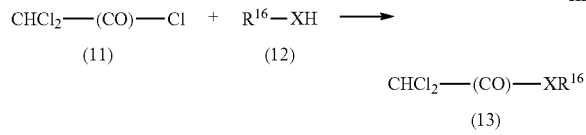

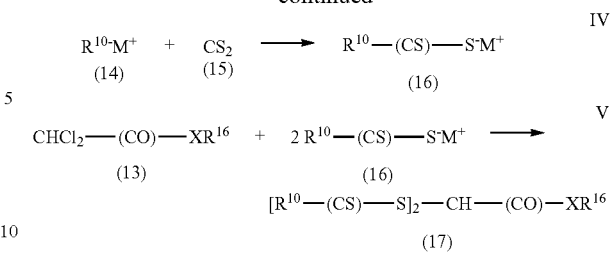

In this reaction scheme, dichloroacetyl chloride (compound (11)) is reacted (Reaction III) with a compound of formula $R^{16}-XH$ (compound (12)), which is an alcohol ($R^{16}-OH$) or an amine ($R^{16}-NR_2H$). Reaction III often is conducted in the presence of a base such as, for example, trimethylamine and a catalyst such as, for example, pyridine or dimethylaminopyridine. Any organic solvent that is present is usually an aprotic solvent such as methylene chloride or tetrahydrofuran. The product of Reaction III is compound (13) of formula $CHCl_2-(CO)-XR^{16}$. Compound (13) is reacted (Reaction V) with compound (16), which can be formed by the reaction (Reaction IV) of a compound of formula $R^{10-}M^+$ (compound (14)) with carbon disulfide (15). Compound (14) is a salt of an alkoxide or of an amine where M+ is usually an alkali metal ion, a tetralkyl ammonium ion, a trialkyl ammonium ion, or a dialkylammonium ion. The reaction (Reaction V) of compound (13) with compound (16) is typically conducted at temperatures between about 0° C. and about 80° C. in the presence of an organic solvent such as acetone, acetonitrile, or an alcohol.

In some examples of Reaction Scheme H, commercially available compounds of formula $CHCl_2-(CO)-XR^{16}$, which is compound (13), are reacted with commercially available compounds of formula $R^{10}-(CS)-S^-M^+$, which is compound (16). Examples of compound (13) include, but are not limited to, methyl dichloroacetate, ethyl dichloroacetate, and butyl dichloroacetate. Examples of compound (16) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

In some embodiments of the photoinitiator of Formula (II), group $R^{10}$ is an alkoxy, aryloxy, alkaryloxy, aralkyloxy, or alkenoxy group. Such $R^{10}$ groups are of formula $-OR^{20}$ where $R^{20}$ is an alkyl, aryl, alkaryl, aralkyl, or alkenyl group. That is the photoinitiator is of Formula (II-1).

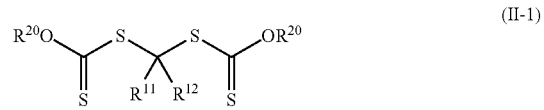

These photoinitiators are bis-dithiocarbonate compounds having a single carbon atom between the two dithiocarbonate groups.

In some other more specific compounds of Formula (II-1), $R^{20}$ is an alkenyl (i.e., $-OR^{20}$ is an alkenoxy). A specific example compound includes, but it not limited to, 1,1-bis (10-undecenyloxycarbothioylsulfanyl)methyl ether.

In other more specific compounds of Formula (II-1), $R^{20}$ is an alkyl (i.e., $-OR^{20}$ is an alkoxy), $R^{11}$ is an alkoxy ($R^{11}$ is of formula $-(OR^4)_p-OR^{15}$ where p is zero, which is equal to —OR$^{15}$), and R$^{12}$ is of formula —(CO)OR$^7$ where R$^{17}$ is an alkyl. A specific example is methyl 2,2-bis(isopropoxycarbothioylsulfanyl)-2-methoxy-acetate.

In some embodiments of Formula (II-1), R$^{12}$ is hydrogen, R$^{11}$ is an alkoxy (R$^{11}$ is of formula —(OR$^4$)$_p$—OR$^{15}$ where p is zero, which is equal to —OR$^{15}$), and R$^{10}$ is an alkoxy, aryloxy, alkaryloxy, aralkyloxy, or alkenyloxy. Such photoinitiators are of Formula (II-1A).

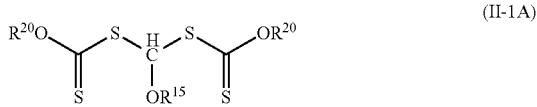

Groups R$^{20}$ is an alkyl, aryl, aralkyl, aralkyl, or alkenyl. In many embodiments of Formula (II-1A), R$^{20}$ is an alkyl. Specific example compounds include, but are not limited to, 1,1-bis(isopropoxycarbothioylsulfanyl)methyl methyl ether, 1,1-bis(isopropoxycarbothioylsulfanyl)methyl butyl ether, or 1,1-bis(ethoxycarbothioylsulfanyl)methyl butyl ether.

In other embodiments of Formula (II-1), R$^{12}$ is hydrogen, R$^{11}$ is a group of formula —(CO)—X—R$^{16}$, and R$^{10}$ is an alkoxy, aryloxy, alkaryloxy, aralkyloxy, or alkenyloxy. Such photoinitiators are of Formula (II-1B).

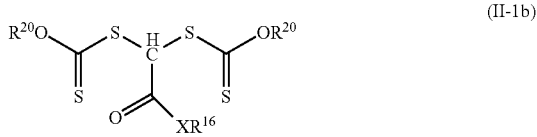

Groups R$^{20}$ is an alkyl, aryl, aralkyl, aralkyl, or alkenyl. The group R$^{20}$ is often an alkyl. Examples of compounds of Formula (II-1B) where X is equal to oxy and R$^{16}$ is an alkyl include, but are not limited to, 2-ethylhexyl 2,2-bis(isopropoxycarbothioylsulfanyl)acetate, methyl 2,2-bis(isopropoxycarbothioylsulfanyl)acetate, and tert-butyl 2,2-bis(isopropoxycarbothioylsulfanyl)acetate. An example of a compound of Formula (II-1B) where X is equal to oxy and R$^{16}$ is an aryl is phenyl 2,2-bis(isopropoxycarbothioylsulfanyl)acetate. An example of a compound of Formula (II-1B) where X is equal to —NR$^{19}$— is N,N-dibutyl-2,2-bis(isopropoxycarbothioylsulfanyl)acetamide. In this compound both R$^{16}$ and R$^{19}$ are alkyl groups.

In other embodiments of the photoinitiator of Formula (II), group R$^{10}$ is of formula —N(R$^{13}$)$_2$.

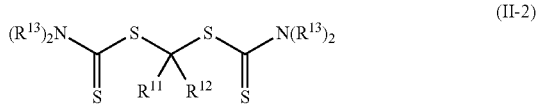

These photoinitiators are bis-dithiocarbamate compounds having a single carbon atom between the two dithiocarbonate groups.

In some embodiments of Formula (II-2), R$^{12}$ is hydrogen and R$^{11}$ is an alkoxy (R$^{11}$ is of formula —(OR$^{14}$)$_p$—OR$^{15}$ where p is zero, which is equal to —OR$^{15}$). Such photoinitiators are of Formula (II-2A). The R$^{12}$ hydrogen is not shown in Formula (II-2A).

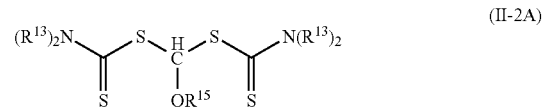

In many such compounds, each R$^3$ is an alkyl. Specific example compounds include, but are not limited to, 1,1-bis(diethylcarbamothioylsulfanyl)methyl butyl ether and 1,1-bis(diethylcarbamothioylsulfanyl)methyl methyl ether.

In other embodiments of Formula (II-2), R$^{12}$ is hydrogen and R$^{11}$ is a group of formula —(CO)—X—R$^{16}$. Such photoinitiators are of Formula (II-2B). The R$^{12}$ hydrogen is not shown in Formula (II-2B).

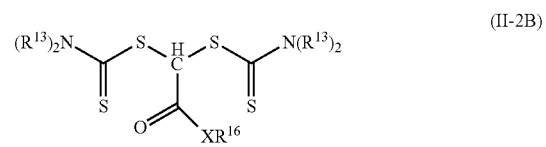

The group R$^{20}$ is often an alkyl. Examples of compounds of Formula (II-2B) where X is equal to oxy and R$^{16}$ is an alkyl include, but are not limited to, 2-ethylhexyl 2,2-bis(diethylcarbamothioylsulfanyl)acetate, methyl 2,2-bis(diethylcarbamothioylsulfanyl)acetate, and octyl 2,2-bis(diethylcarbamothioylsulfanyl)acetate.

The amount of the photoinitiator of Formula (II) included in the reaction mixture impacts the weight average molecular weight of the resulting silicone-based elastomeric material. That is, the weight average molecular weight can be controlled based on the amount of photoinitiator added to the reaction mixture. The amount of photoinitiator is typically in a range of 0.001 to 5 weight percent based on the weight of polymerizable material in the reaction mixture. The polymerizable material refers to components having ethylenically unsaturated groups such as the silicone compound having at least two ethylenically unsaturated groups and optional silicone compound having a single ethylenically unsaturated group. For comparable reaction conditions, increasing the amount of photoinitiator tends to decrease the weight average molecular weight (as well as the number average molecular weight). The amount of the photoinitiator is typically at least 0.001 weight percent, at least 0.005 weight percent, at least 0.01 weight percent, at least 0.02 weight percent, at least 0.03 weight percent, or at least 0.5 weight percent and can be up to 5 weight percent, up to 3 weight percent, up to 2 weight percent, or up to 1 weight percent.

Silicone Tackifying Resin

The pressure-sensitive adhesive includes a silicone tackifying resin. Suitable silicate tackifying resins include those resins composed of the following structural units M (i.e., monovalent R'$_3$SiO$_{1/2}$ units), D (i.e., divalent R'$_2$SiO$_{2/2}$ units), T (i.e., trivalent R'SiO$_{3/2}$ units), and Q (i.e., quaternary SiO$_{4/2}$ units), and combinations thereof. The group R' is typically an aryl or alkyl but can be a reactive group such as a hydroxyl group, hydrogen, or vinyl group. R' is often methyl.

Exemplary silicon tackifying resins include MQ resins, MQD resins, and MQT resins. Blends of two or more silicone tackifying resins can be used, if desired. These silicone tackifying resins usually have a number average molecular weight in the range of 100 to 50,000 Daltons or in the range of 500 to 15,000 Daltons.

Suitable silicone tackifying resins are commercially available from sources such as Dow Corning (Midland, Mich., USA), General Electric Silicones (Waterford, N.Y., USA), Rhodia Silicones (Rock Hill, S.C., USA), and Wacker Chemical Corporation (Adrian, Mich., USA). Such tackifying resins are generally supplied in organic solvent and may be used as received in the reaction mixture used to form the pressure-sensitive adhesives. Alternatively, the tackifying resins can be dried by any number of techniques known in the art to remove the organic solvent prior to addition of the tackifying resin to the reaction mixture used to form the pressure-sensitive adhesive. Suitable drying methods include, but are not limited to, spray drying, oven drying, steam separation, and the like.

The silicone tackifying resin can influence the physical properties of the resulting pressure-sensitive adhesive. For example, as the amount of the silicone tackifying resin content is increased, the glassy to rubbery transition of the pressure-sensitive adhesives tends to occur at increasingly higher temperatures. The amount of the silicone tackifying resin is typically in a range of 20 to 65 weight percent based on the total weight of solids in the reaction mixture used to form the pressure-sensitive adhesive. The amount is at least 20 weight percent, at least 25 weight percent, at least 30 weight percent, at least 35 weight percent, at least 40 weight percent, at least 45 weight percent, at least 50 weight percent, and up to 65 weight percent, up to 60 weight percent, up to 55 weight percent, up to 50 weight percent, up to 45 weight percent, or up to 40 weight percent based on the total weight of solids in the reaction mixture. For example, the amount can be in a range of 20 to 60 weight percent, 20 to 50 weight percent, 20 to 40 weight percent, 25 to 65 weight percent, 25 to 60 weight percent, 25 to 50 weight percent, 30 to 65 weight percent, or 30 to 60 weight percent, 30 to 50 weight percent, 40 to 65 weight percent, or 40 to 60 weight percent.

Optional Filler

The reaction mixture used to form the pressure-sensitive adhesive can contain an optional filler. Often, the fillers are inorganic oxide particles. Adding such a filler can enhance the mechanical properties (e.g., films can be more resistant to tearing) or to provide other desirable characteristics to the resulting pressure-sensitive adhesive.

Examples of suitable inorganic oxide particles include, but are not limited to, oxides of silicon, titanium, aluminum, zirconium, zinc, antimony, geranium, cerium, vanadium, tin, indium, iron, and the like. The inorganic oxide particles can be of any desired size. For example, the inorganic oxide particles can have an average longest dimension in a range of 1 nanometer to 10 micrometers. If clarity is desired, the filler is typically selected to have an average longest dimension that is no greater than 1000 nanometer, no greater than 500 nanometers, no greater than 200 nanometers, no greater than 100 nanometers, no greater than 50 nanometers, or no greater than 20 nanometers. The average particle size can be determined, for example, using various techniques such as scanning or transmission electron microscopy.

In some embodiments, the inorganic oxide is silica. The silica can be in the form of a silica sol having an average particle size no greater than 100 nanometers. Alternatively, the silica can be in the form of aggregates such as fumed silica. Fumed silica and silica sols are commercially available in a variety of sizes from multiple suppliers.

In some embodiments that include inorganic oxide particles, these particles are surface modified by treating them with a surface modification agent. Surface modification can improve compatibility of the inorganic oxide particle with the silicone-based elastomeric material. Surface modification agents may be represented by the formula A-B where the A group can attach to the surface of the inorganic oxide particle and where B is a compatibilizing group. The A group can be attached to the surface by adsorption, formation of an ionic bond, formation of a covalent bond, or a combination thereof. Suitable examples of A groups include, for example, carboxylic acid groups or salts thereof, sulfonic acid groups or salts thereof, phosphoric acid groups or salts thereof, phosphonic acid groups and salts thereof, silyl groups, and the like. The compatabilizing group B can be reactive or nonreactive and polar or non-polar.

Compatibilizing groups B that can impart polar character to the inorganic oxide particles include, for example, polyether groups. Representative examples of polar modifying agents having carboxylic acid functionality include MEEAA, MEAA, and mono(polyethylene glycol)succinate.

Compatibilizing groups B that can impart non-polar character to the inorganic oxide particles include, for example, linear or branched aromatic or aliphatic hydrocarbon groups. Representative examples of non-polar modifying agents having carboxylic acid functionality include octanoic acid, dodecanoic acid, stearic acid, oleic acid, and combinations thereof.

Exemplary silane surface modifying agents include, but are not limited to, alkyltrialkoxysilanes such as n-octyltrimethoxysilane, n-octyltriethoxysilane, isooctyltrimethoxysilane, dodecyltrimethoxysilane, octadecyltrimethoxysilane, propyltrimethoxysilane, and hexyltrimethoxysilane; methacryloxyalkyltrialkoxysilanes or acryloxyalkyltrialkoxysilanes such as 3-methacryloxypropyltrimethoxysilane, 3-acryloxypropyltrimethoxysilane, and 3-(methacryloxy)propyltriethoxysilane; methacryloxyalkylalkyldialkoxysilanes or acryloxyalkylalkyldialkoxysilanes such as 3-(methacryloxy)propylmethyldimethoxysilane, and 3-(acryloxypropyl)methyldimethoxysilane; methacryloxyalkyldialkylalkoxysilanes or acryloxyalkyldialkylalkoxysilanes such as 3-(methacryloxy)propyldimethylethoxysilane; mercaptoalkyltrialkoxylsilanes such as 3-mercaptopropyltrimethoxysilane; aryltrialkoxysilanes such as styrylethyltrimethoxysilane, phenyltrimethoxysilane, phenyltriethoxysilane, and p-tolyltriethoxysilane; vinyl silanes such as vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, and vinyltris(2-methoxyethoxy)silane; 3-glycidoxypropyltrialkoxysilane such as glycidoxypropyltrimethoxysilane; polyether silanes such as N-(3-triethoxysilylpropyl)methoxyethoxyethoxyethyl carbamate (PEG3TES), N-(3-triethoxysilylpropyl) methoxyethoxyethoxyethyl carbamate (PEG2TES), and SILQUEST A-1230); and combinations thereof.

Other suitable surface modifying agents have a nitrogen atom covalently bonded to a silicon atom. Examples include, but are not limited to, hexamethyldisilazane, di(t-butylamino)silane, 1,1,3,3,5,5-hexamethylcyclotrisilazane, and methacrylamidotrimethylsilane.

The amount of the surface modifying agent used it typically selected to provide close to a monolayer of the surface modifying agent on the surface of the inorganic oxide particles.

The amount of filler in the reaction mixture is typically in a range of 0 to 20 weight percent. Greater amounts may compromise the peel strength or the tackiness. The amount is often at least 0.1 weight percent, at least 0.5 weight percent, at least 1 weight percent, at least 2 weight percent, or at least 3 weight percent, or at least 5 weight percent and can be up to 20 weight percent, up to 15 weight percent, up to 10 weight percent, or up to 5 weight percent. The amount is often in a range of 0.1 to 20 weight percent, 0.1 to 15 weight percent, 0.1 to 10 weight percent, 0.1 to 5 weight percent, 0.5 to 20 weight percent, 0.5 to 15 weight percent, 0.5 to 10 weight percent, 0.5 to 5 weight percent, 1 to 20 weight percent, 1 to 10 weight percent, or 1 to 5 weight percent. The amount is based on the total weight of solids in the reaction mixture.

Optional Organic Solvent

The reaction mixture used to form the pressure-sensitive adhesive can contain an optional organic solvent. As used herein, the term "organic solvent" refers to a non-reactive compound that is a liquid at room temperature. The organic solvent is typically added to lower the viscosity of the reaction mixture. A lower viscosity can facilitate mixing of the reaction mixture and application of the reaction mixture to a surface.

Suitable solvents are those that can dissolve the other components of the reaction mixture such as the photoinitiator, the silicone compound having at least two ethylenically unsaturated groups, and the silicone tackifying resin. The organic solvent can be polar, nonpolar, or mixture of both. Examples include, but are not limited to, various alcohols (e.g., ethanol and isopropanol), alkanes (e.g., heptane, hexane, and cyclohexane), aromatics (e.g., toluene and xylene), ketones (methyl ethyl ketone, methyl isobutyl ketone, and acetone), ethyl acetate, N,N-dimethylformamide, acetonitrile, tetrahydrofuran, dimethyl sulfoxide, hexamethyl disiloxane, and the like.

The amount of the optional organic solvent can be in a range of 0 to 30 weight percent based on a total weight of the reaction mixture used to form the silicone-based pressure-sensitive adhesive. If more than this amount is used, the viscosity may be too low to apply as a coating layer. Further, using less organic solvent is typically considered preferable from a cost and environments perspective. In some embodiments, the reaction mixture contains at least 1 weight percent, at least 2 weight percent, at least 10 weight percent, or at least 15 weight percent and can include up to 30 weight percent, up to 25 weight percent, up to 20 weight percent, or up to 15 weight percent organic solvent.

Formation of the Silicone-Based Pressure-Sensitive Adhesive and Articles Containing the Silicone-Based Pressure-Sensitive Adhesive The pressure-sensitive adhesive is a reaction product of a reaction mixture containing (a) a silicone compound having at least two ethylenically unsaturated groups, (b) a photoinitiator of Formula (II) as described above, and (c) a silicone tackifying resin. In some embodiments one or more optional components are also in the reaction mixture. Optional components include, but are not limited to, a silicone compound having a single ethylenically unsaturated group, a filler (e.g., inorganic oxide particles that may optionally be surface modified), and an organic solvent.

Some reaction mixtures used to form the silicone-based pressure-sensitive adhesive contain at least 30 weight percent of the silicone compound having at least two ethylenically unsaturated groups, at least 0.001 weight percent of the photoinitiator of Formula (II), and at least 20 weight percent of a silicone tackifying agent. The amounts are based on a total weight of solids in the reaction mixture. The solids are all components of the reaction mixture except the optional organic solvent. The reaction mixture can further include 0 to 30 weight percent organic solvent based on a total weight of the reaction mixture.

For example, the reaction mixtures often contain 30 to 80 weight percent of the silicone compound having at least two ethylenically unsaturated groups, 0.001 to 5 weight percent of the photoinitiator of Formula (II), and 20 to 65 weight percent silicone tackifying resin. Any of these compositions can further include 0 to 25 weight percent of a silicone compound having a single ethylenically unsaturated group and/or 0 to 20 weight percent of a filler based on the total weight of solids in the reaction mixture. Any of the compositions can further include 0 to 30 weight percent organic solvent based on the total weight of reaction mixture.

Some example reaction mixtures contain 30 to 70 weight percent of the silicone compound having at least two ethylenically unsaturated groups, 0.001 to 5 weight percent of the photoinitiator of Formula (II), and 25 to 65 weight percent silicone tackifying resin. Other example reaction mixtures contain 30 to 60 weight percent of the silicone compound having at least two ethylenically unsaturated groups, 0.001 to 5 weight percent of the photoinitiator of Formula (II), and 35 to 65 weight percent silicone tackifying resin. Still other reaction mixtures contain 40 to 60 weight percent of the silicone compound having at least two ethylenically unsaturated groups, 0.001 to 5 weight percent of the photoinitiator of Formula (II), and 35 to 60 weight percent silicone tackifying resin. Any of these compositions can further include 0 to 25 weight percent of a silicone compound having a single ethylenically unsaturated group and/or 0 to 20 weight percent of a filler based on the total weight of solids in the reaction mixture. Any of the compositions can further include 0 to 30 weight percent organic solvent based on the total weight of reaction mixture.

The reaction mixture can be exposed to actinic radiation having a UVA maximum in a range of 280 to 425 nanometers. Ultraviolet light sources can be of various types. Low light intensity lights such as black lights, generally provide intensities ranging from 0.1 or 0.5 mW/cm$^2$ (milliWatts per square centimeter) to 10 mW/cm$^2$ (as measured in accordance with procedures approved by the United States National Institute of Standards and Technology as, for example, with a UVIMAP UM 365 L-S radiometer manufactured by Electronic Instrumentation & Technology, Inc., in Sterling, Va.). High light intensity sources generally provide intensities greater than 10, 15, or 20 mW/cm$^2$ ranging up to 450 mW/cm$^2$ or greater. In some embodiments, high intensity light sources provide intensities up to 500, 600, 700, 800, 900 or 1000 mW/cm$^2$. The UV light can be provided by various light sources such as light emitting diodes (LEDs), black lights, medium pressure mercury lamps, etc. or a combination thereof. Higher intensity light sources as available from Fusion UV Systems Inc. The UV exposure time for forming the elastomeric material can vary depending on the intensity of the light source(s) used. For example, complete curing with a low intensity light course can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds.

Upon exposure of the reaction mixture to actinic radiation in the ultraviolet region of the electromagnetic spectrum, a controlled radical polymerization reaction commences. That is, the ethylenically unsaturated groups react and a silicone-based elastomeric material is formed. The silicone-based elastomeric material contains the polymerized product of any compounds in the reaction mixture that have ethylenically unsaturated groups, which typically includes the silicone compound having at least two ethylenically unsaturated groups and any optional silicone compound having a single ethylenically unsaturated group.

The silicone-based elastomeric material that is formed using the photoinitiator of Formula (II) has different characteristics than known silicone-based elastomeric materials that are using conventional photoinitiators such as Norrish type-1 photoinitiators. This difference is reflected in the silicone-based pressure-sensitive adhesive properties. Examples of Norrish type-1 photoinitiators include 2-benzyl-2-(dimethylamino)-4'-morpholinobutyrophenone; 1-hydroxycyclohexyl-phenyl ketone; 2-methyl-1-[4-(methylthio)phenyl]-2-morpholinopropan-1-one; 2-hydroxy-2-methyl-1-phenylpropanone; 1-[4-(2-hydroxyethoxy)-phenyl]-2-hydroxy-2-methylpropanone; 2,2-dimethoxy-2-phenylacetophenone; acylphosphine oxide derivatives, acylphosphinate derivatives, and acylphosphine derivatives (e.g., phenylbis(2,4,6-trimethylbenzoyl)phosphine oxide (available as OMNIRAD 819 from IGM Resins, St. Charles, Ill.), phenylbis(2,4,6-trimethylbenzoyl)phosphine (e.g., available as OMNIRAD 2100 from IGM Resins), bis(2,4,6-trimethylbenzoyl)phenylphosphine oxide, 2,4,6-trimethylbenzoyldiphenylphosphine oxide (e.g., available as OMNIRAD 8953X from IGM Resins), isopropoxyphenyl-2,4,6-trimethylbenzoylphosphine oxide, dimethyl pivaloylphosphonate), ethyl (2,4,6-trimethylbenzoyl) phenyl phosphinate (e.g., available as OMNIRAD TPO-L from IGM Resins); and bis(cyclopentadienyl) bis[2,6-difluoro-3-(1-pyrryl)phenyl] titanium (e.g., available as OMNIRAD 784 from IGM Resins).

More specifically, the silicone-based pressure-sensitive adhesives usually have improved peel strength adhesion and improved shear strength compared to silicone-based pressure-sensitive adhesives formed using conventional Norrish type-1 photoinitiators. While not wishing to be bound by theory, the silicone-based elastomeric materials formed using the photoinitiators of Formula (II) tend to be more highly branched and less crosslinked than silicone-based elastomeric materials prepared using conventional photoinitiators. Support for this conclusion is based on the determination of the percent extractable content of the silicone-based elastomeric material formed in the absence of the silicone tackifying resin. The measurement of the percent extractable content is described in the Example section below.

The percent extractable content of the silicone-based polymeric materials formed with conventional photoinitiators tend to be no greater than 5 weight percent or no greater than 10 weight percent, which suggests that most of the silicone-based polymeric material is crosslinked. It can be difficult to obtain a silicone-based polymeric material with sufficient elasticity using conventional photoinitiators because of the high crosslinking density of the silicone-based polymeric material.

In contrast, the percent extractable content of the silicone-based elastomeric materials formed with photoinitiators of Formula (II) tends to be at least 15 weight percent, at least 25 weight percent, at least 40 weight percent, at least 50 weight percent, at least 60 weight percent, at least 75 weight percent, or at least 80 weight percent. That is the percent extractable content is often in a range of 15 to 95 weight percent, 25 to 95 weight percent, 50 to 95 weight percent, or 75 to 95 weight percent. These silicone-based elastomeric materials are more highly branched rather than crosslinked and this tends to increase the tensile strength.

To form a silicone-based pressure-sensitive adhesive, the reaction mixture is typically applied as a layer to a substrate and exposed to actinic radiation while being supported by the substrate. The substrate can be flexible or inflexible and can be formed from a polymeric material, glass or ceramic material, metal, or combination thereof. Some substrates are polymeric films such as those prepared from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose). Other substrates are metal foils, nonwoven materials (e.g., paper, cloth, nonwoven scrims), foams (e.g., polyacrylic, polyethylene, polyurethane, neoprene), and the like. For some substrates, it may be desirable to treat the surface to improve adhesion to the silicone-based pressure-sensitive adhesive. Such treatments include, for example, application of a primer layer, surface modification layer (e.g., corona treatment or surface abrasion), or both.

In some embodiments, the substrate is a release liner. Release liners typically have low affinity for the silicone-based pressure-sensitive adhesive. Exemplary release liners can be prepared from paper (e.g., Kraft paper) or other types of polymeric material. Some release liners are coated with an outer layer of a release agent such as a silicone-containing material or a fluorocarbon-containing material.

The reaction mixture can be positioned next to a substrate using a roll-to-roll process. That is, the substrate can be moved from a first roll to a second roll in a continuous process. As the substrate moves between the first roll and the second roll, it can be coated with the reaction mixture. Such a substrate can be regarded as being a web and the web is often a polymeric material such as those described above. The polymeric web can be unrolled from a first roll, coated with the reaction mixture, exposed to actinic radiation (e.g., ultraviolet radiation) for polymerization, and then rolled onto the second roll.

The reaction mixture layer can have any desired thickness. The thickness of the reaction mixture is typically selected so that it can be effectively polymerized when exposed to actinic radiation (e.g., ultraviolet radiation). In many embodiments, the reaction mixture thickness layer has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness is often at least 0.5 mils (12.5 micrometers) or at least 1 mil (25 micrometers). For example, the thickness of the reaction mixture layer can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

The polymerized product is a pressure-sensitive adhesive that contains both a silicone-based elastomeric material plus a silicone tackifying resin. The silicone-based elastomeric material is the polymerized product of (a) a silicone compound having at least two ethylenically unsaturated groups and (b) a photoinitiator of Formula (II).

Likewise, articles are provided. The articles include a substrate and a layer of a silicone-based pressure-sensitive adhesive positioned adjacent to the substrate. The silicone-based pressure-sensitive adhesive can directly contract the substrate or can be separated from the substrate by a primer layer, surface modification layer, or both. Any of the substrates mentioned above can be used. In some embodiments, the article is an adhesive tape with the substrate being a backing layer for the adhesive tape. In some examples, the article has a silicone-based pressure-sensitive adhesive on opposite sides of a substrate. Such an article can be a dual layer adhesive tape. In some other embodiments, the article is a transfer tape wherein the substrate is a release liner. In some examples, the layer of the silicone-based pressure-sensitive adhesive is positioned between two release liners.

The silicone-based pressure-sensitive adhesive layer typically contains at least 35 weight percent silicone-based elastomeric material and at least 20 weight percent silicone tackifying resin based on a total weight of the silicone-based pressure-sensitive adhesive. Other optional components such as the fillers described above can be include in the pressure-sensitive adhesive composition.

Some example silicone-based pressure-sensitive adhesive layers contain 35 to 80 weight percent silicone-based elastomeric material based on the total weight of the silicone-based pressure-sensitive adhesive. The amount can be at least 35 weight percent, at least 40 weight percent, at least 50 weight percent, at least 60 weight percent and can be up to 80 weight percent, up to 75 weight percent, up to 70 weight percent, up to 65 weight percent, or up to 60 weight percent.

Some example silicone-based pressure-sensitive adhesive layers contain 20 to 65 weight percent silicone tackifying resin based on a total weight of the silicone-based pressure-sensitive adhesive. The amount can be at least 20 weight percent, at least 25 weight percent, at least 30 weight percent, at least 35 weight percent or at least 40 weight percent and can be up to 65 weight percent, up to 60 weight percent, up to 55 weight percent, up to 50 weight percent, up to 45 weight percent, or up to 40 weight percent.

In some embodiments, the composition of the silicone-based pressure-sensitive adhesive layer contains 35 to 80 weight percent silicone-based elastomeric material and 20 to 65 weight percent of the silicone tackifying agent based on the total weight of the silicone-based pressure-sensitive adhesive. In some examples, the composition of the silicone-based pressure-sensitive adhesive layer contains 40 to 80 weight percent silicone-based elastomeric material and 20 to 60 weight percent of the silicone tackifying agent based on the total weight of the silicone-based pressure-sensitive adhesive. In still other examples, the composition of the silicone-based pressure-sensitive adhesive layer contains 40 to 60 weight percent silicone-based elastomeric material and 40 to 61 weight percent of the silicone tackifying agent based on the total weight of the silicone-based pressure-sensitive adhesive. Any of these silicone-based pressure-sensitive adhesive layers can further contain optional components such as, for example, 0 to 20 weight percent filler based on the total weight of the silicone-based pressure-sensitive adhesive.

Some example articles have a substrate that includes a film containing a silicone-based elastomeric material. For example, the substrate can be formed by mixing a silicone compound having at least ethylenically unsaturated groups and a photoinitiator of Formula (II) as described above. That is, the substrate is made without a silicone tackifying resin in the mixture. The mixture can be exposed to actinic radiation such as described above for the silicone-based pressure-sensitive adhesive layer.

Various embodiments are provided such as a silicone-based pressure-sensitive adhesive, a reaction mixture used to form the silicone-based pressure-sensitive adhesive, an article, and a method of making the silicone-based pressure-sensitive adhesive.

Embodiment 1A is a reaction mixture that can be used to form a silicone-based pressure-sensitive adhesive. The reaction mixture contains (a) a silicone compound having at least two ethylenically unsaturated groups, (b) a photoinitiator of Formula (II), and (c) a silicone tackifying resin.

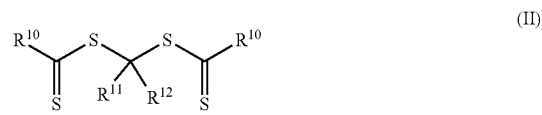

In Formula (II), each $R^{10}$ is an alkoxy, aryloxy, alkaryloxy, aralkyloxy, alkenoxy, or —N($R^{13}$)$_2$. Group $R^{11}$ is of formula —(O$R^4$)$_p$—O$R^{15}$ or a group of formula —(CO)—X—$R^{16}$. Group $R^{12}$ is a hydrogen, alkyl, aryl, alkaryl, aralkyl, a group of formula —(CO)O$R^{17}$, or a group of formula —(CO)N($R^{18}$)$_2$. Each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R^{14}$ is an alkylene. $R^{15}$ is an alkyl and $R^{16}$ is hydrogen, alkyl, aryl, aralkyl, or alkaryl. Group $R^{17}$ is an alkyl, aryl, aralkyl, or alkaryl and each $R^{18}$ is an alkyl, aryl, aralkyl, or alkaryl. Group X is oxy or —N$R^{19}$— and group $R^{19}$ is hydrogen, alkyl, aryl, aralkyl, or alkaryl. The variable p is an integer equal to at least 0.

Embodiment 2A is the reaction mixture of embodiment 1A, wherein the ethylenically unsaturated groups of the silicone compound are (meth)acryloyl groups.

Embodiment 3A is the reaction mixture of embodiment 1A or 2A, wherein the silicone compound having at least two ethylenically unsaturated groups is of Formula (I).

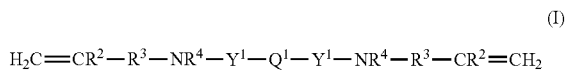

In Formula (I), $Q^1$ is a polydiorganosiloxane group; each $Y^1$ is an alkylene, arylene, aralkylene, or a combination thereof, each $R^2$ is a hydrogen or methyl; each $R^3$ is a single bond or is a divalent group that is a carbonyl, carbonylimino, carbonyloxy, imino, oxy, alkylene, alkylene substituted with a hydroxyl group, aralkylene, or a combination thereof, and each $R^4$ is hydrogen or an alkyl.

Embodiment 4A is the reaction mixture of any one of embodiments 1A to 3A, wherein $Q^1$ is of formula

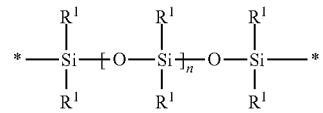

where each $R^1$ is independently an alkyl, haloalkyl, aralkyl, alkenyl, aryl, or aryl substituted with an alkyl, alkoxyl, or halo. The variable n is an integer in a range of 0 to 1500. The asterisks (*) are the location of attachment to other groups in the compound (i.e., groups $Y^1$ in the compound of Formula (I)).

Embodiment 5A is the reaction mixture of embodiment 4A, wherein at least 50 percent of the $R^1$ groups are methyl.

Embodiment 6A is the reaction mixture of embodiment 4A or 5A, wherein $Q^1$ is a polydimethylsiloxane group.

Embodiment 7A is the reaction mixture of any one of embodiments 3A to 6A, wherein $Y^1$ is an alkylene.

Embodiment 8A is the reaction mixture of any one of embodiments 3A to 7A, wherein $Y^1$ is propylene.

Embodiment 9A is the reaction mixture of any one of embodiments 3A to 8A, wherein $R^3$ is a carbonyl group.

Embodiment 10A is the reaction mixture of any one of embodiments 3A to 9A, wherein $R^3$ is —(CO)—NH—C$(CH_3)_2$—(CO)—, which is a combination of a carbonylimino, alkylene, and carbonyl groups.

Embodiment 11A is the reaction mixture of any one of embodiments 3A to 9A, wherein $R^3$ is —(CO)—O—$CH_2CH_2$—NH—(CO)—, which is a combination of carbonyloxy, alkylene and carbonylimino (or immocarbonyl) groups.

Embodiment 12A is the reaction mixture of any of embodiments 3A to 9A, wherein $R^3$ is -Ph-C$(CH_3)_2$—NH—(CO)—, which is a combination of an arylene, alkylene, and carbonylimino (imminocarbonyl) group.

Embodiment 13A is the reaction mixture of any one of embodiments 3A to 9A, wherein $R^3$ is —(CO)—O—$CH_2$—CH(OH)—$CH_2$—, which is a combination of carbonyloxy and an alkylene substituted with a hydroxyl group.

Embodiment 14A is the reaction mixture of any one of embodiments 1A to 13A, wherein $R^{12}$ is hydrogen and $R^{11}$ is of formula —$(OR^{14})_p$—$OR^{15}$ where p is equal to zero (i.e., $R^{11}$ is of formula —$OR^{15}$).

Embodiment 15A is the reaction mixture of any one of embodiments 1A to 13A, wherein $R^{12}$ is hydrogen and $R^{11}$ is of formula —(CO)—$XR^{16}$.

Embodiment 16A is the reaction mixture of embodiment 14A or 15A, wherein the photoinitiator of Formula (II) is of Formula (II-1A) or Formula (II-1B).

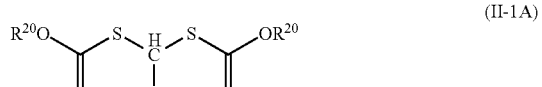

(II-1A)

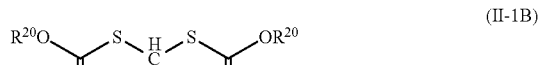

(II-1B)

In these formulas, $R^{20}$ is an alkyl, aryl, alkaryl, aralkyl, or alkenyl; $R^{15}$ is an alkyl; $R^{16}$ is hydrogen, alkyl, aryl, aralkyl, or alkaryl; X is oxy or —$NR^{19}$—; and $R^{19}$ is hydrogen, alkyl, aryl, aralkyl, or alkaryl.

Embodiment 17A is the reaction mixture of embodiment 16A, wherein the photoinitiator is of Formula (II-1A) and $R^{20}$ is an alkyl.

Embodiment 18A is the reaction mixture of embodiment 16A, wherein the photoinitiator is of Formula (II-1B), $R^{20}$ is alkyl, $R^{16}$ is alkyl, X is oxy.

Embodiment 19A is the reaction mixture of embodiment 16A, wherein the photoinitiator is of Formula (II-1B), $R^{20}$ is alkyl, X is —$NR^{19}$—, $R^{19}$ is hydrogen or alkyl, and $R^{16}$ is alkyl.

Embodiment 20A is the reaction mixture of embodiment 14A or 15A, wherein the photoinitiator of Formula (II) is of Formula (II-2A) or Formula (II-2B).

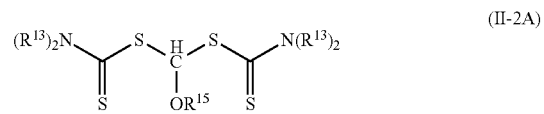

(II-2A)

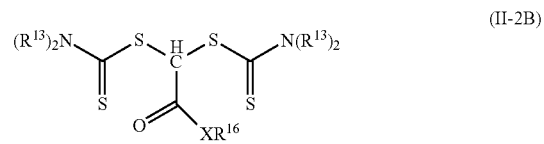

(II-2B)

In these formulas, each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic;
$R^{15}$ is an alkyl; $R^{16}$ is hydrogen, alkyl, aryl, aralkyl, or alkaryl; X is oxy or —$NR^{19}$—; and $R^{19}$ is hydrogen, alkyl, aryl, aralkyl, or alkaryl.

Embodiment 21A is the reaction mixture of embodiment 20A, wherein the photoinitiator is of Formula (II-2A) and each $R^{13}$ is an alkyl.

Embodiment 22A is the reaction mixture of embodiment 20A, wherein the photoinitiator is of Formula (II-2B), each $R^{13}$ is alkyl, X is oxy, and $R^{16}$ is alkyl.

Embodiment 23A is the reaction mixture of embodiment 20A, wherein the photoinitiator is of Formula (II-2B), each $R^{13}$ is alkyl, X is —$NR^{19}$—, $R^{19}$ is hydrogen or alkyl, and $R^{16}$ is alkyl.

Embodiment 24A is the reaction mixture of any one of embodiments 1A to 23A, wherein the reaction mixture further comprises a silicone compound having a single ethylenically unsaturated group.

Embodiment 25A is the reaction mixture of any one of embodiments 1A to 24A, wherein the silicone compound having a single ethylenically unsaturated group is of Formula (IV).

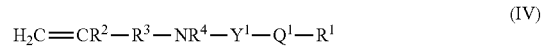

(IV)

In Formula (IV), $R^1$ is an alkyl, haloalkyl, aralkyl, alkenyl, aryl, or aryl substituted with an alkyl, alkoxyl, or halo. $Q^1$ is a polydiorganosiloxane group; each $Y^1$ is an alkylene, arylene, aralkylene, or a combination thereof; each $R^2$ is a hydrogen or methyl; each $R^3$ is a single bond or is a divalent group that is a carbonyl, carbonylimino, carbonyloxy, imino, oxy, alkylene, alkylene substituted with a hydroxyl group, aralkylene, or a combination thereof; and each $R^4$ is hydrogen or an alkyl.

Embodiment 26A is the reaction mixture of any one of embodiments 1A to 25A, wherein the reaction mixture further comprises a filler.

Embodiment 27A is the reaction mixture of any one of embodiments 1A to 26A, wherein the filler is an inorganic oxide.

Embodiment 28A, is the reaction mixture of embodiment 27A, wherein the inorganic oxide is treated with a surface modification agent.

Embodiment 29A is the reaction mixture of any one of embodiments 1A to 28A, wherein the reaction mixture comprises at least 30 weight percent of the silicone compound having at least two ethylenically unsaturated groups, at least 0.001 weight percent of the photoinitiator of Formula (II), and at least 20 weight percent of a silicone tackifying agent, where each amount is based on a total weight of solids in the reaction mixture.

Embodiment 30A is the reaction mixture of embodiment 29A, wherein the reaction mixtures comprise 30 to 80 weight percent of the silicone compound having at least two ethylenically unsaturated groups, 0.001 to 5 weight percent of the photoinitiator of Formula (II), and 20 to 65 weight percent silicone tackifying resin.

Embodiment 31A is the reaction mixture of embodiment 29A or 30A, wherein the reaction mixture optionally further comprises 0 to 25 weight percent of a silicone compound having a single ethylenically unsaturated group and/or 0 to 20 weight percent of a filler based on the total weight of solids in the reaction mixture.

Embodiment 32A is the reaction mixture of any one of embodiments 29A to 31A, wherein the reaction mixture optionally further comprises 0 to 30 weight percent organic solvent based on the total weight of the reaction mixture.

Embodiment 1B is a silicone-based pressure-sensitive adhesive composition. The silicone-based pressure-sensitive adhesive is a reaction product (polymerized product) of a reaction mixture of embodiment 1A. The silicone-based pressure-sensitive adhesive includes a mixture of a silicone-based elastomeric material and a silicone tackifying agent.

Embodiment 2B is the silicone-based pressure-sensitive adhesive composition of embodiment 1B, wherein the silicone-based pressure-sensitive adhesive is a reaction product of a reaction mixture of any one of embodiments 2A to 32A.

Embodiment 1C is an article. The article comprises a silicone-based pressure-sensitive adhesive layer and a substrate, wherein the silicone-based pressure-sensitive adhesive is of embodiment 1B and is positioned adjacent to the substrate.

Embodiment 2C is the article of embodiment 1C, wherein the silicone-based pressure-sensitive adhesive is of embodiment 2B.

Embodiment 3C is the article of embodiment 1C or 2C, wherein the substrate is a release liner.

Embodiment 4C is the article of any one of embodiments 1C to 3C, wherein the substrate comprises a silicone-based elastomeric material.

Embodiment 5C is the article of embodiment 4C, wherein the silicone-based elastomeric material is formed from a reaction mixture comprising a silicone compound having at least two ethylenically unsaturated groups and a photoinitiator of Formula (II).

Embodiment 6C is the article of any one of embodiments 1C to 5C, wherein the article is an adhesive tape and the substrate is a backing for the adhesive tape.

Embodiment 7C is the article of any one of embodiments 1C to 5C, wherein the article is a transfer tape and the substrate is a release liner.

Embodiment 1D is a method of making a silicone-based pressure-sensitive adhesive comprising a silicone-based elastomeric material and a silicone tackifying resin. The method includes forming a reaction mixture of embodiment 1A. The method further includes exposing the reaction mixture to actinic radiation to form the silicone-based pressure-sensitive adhesive.

Embodiment 2D is the method of embodiment 1D, wherein the reaction mixture is of embodiment 2A to 32A.

Embodiment 3D is the method of embodiment 1D or 2D, wherein the actinic radiation is UV radiation.

Embodiment 1E is a silicone-based pressure-sensitive adhesive. The silicone-based pressure-sensitive adhesive comprises (a) a silicone-based elastomeric material and (b) a silicone tackifying resin. The silicone-based elastomeric material is a polymerized product of a reaction composition that includes (1) a silicone compound having at least two ethylenically unsaturated groups and (b) a photoinitiator of Formula (II) as described above.

Embodiment 2E is the silicone-based pressure-sensitive adhesive of embodiment 1E, wherein the silicone-based pressure-sensitive adhesive comprises 35 to 80 weight percent silicone-based elastomeric material and 20 to 65 weight percent silicone tackifying resin based on a total weight of the silicone-based pressure-sensitive adhesive.

Embodiment 3E is the silicone-based pressure-sensitive adhesive of embodiment 1E or 2E, wherein the silicone-based pressure-sensitive adhesive comprises 40 to 60 weight percent silicone-based elastomeric material and 40 to 60 weight percent silicone tackifying resin based on a total weight of the silicone-based pressure-sensitive adhesive.

Embodiment 4E is the silicone-based pressure-sensitive adhesive of any one of embodiments 1E to 3E, wherein the silicone-based pressure-sensitive adhesive further comprises 0 to 20 weight percent filler based on a total weight of the silicone-based pressure-sensitive adhesive.

Examples

Materials

| Name or Abbreviation | Description |
| --- | --- |
| I651 | Refers to 2,2-Dimethoxy-1,2-diphenylethan-1-one, which is available under the trade designation IRGACURE 651 from Ciba Specialty Chemicals, Tarrytown, NY (USA). |
| APTPDMS | Refers to aminopropyl terminated polydimethylsiloxane that was prepared according to U.S. Pat. No. 5,214,119 (Leir et al.) with a number average molecular weight of about 33,000 grams/mole. |
| Vinyl azlactone | Refers to 4,4-dimethyl-2-vinyl 2-oxazolin-5-one, which is available from Polysciences Incorporated, Warrington, PA (USA). |

Examples
Materials

| Name or Abbreviation | Description |
|---|---|
| MAPTPDMS | Refers to monoaminopropyl terminated polydimethylsiloxane, which is an asymmetric compound that is a liquid having a molecular mass of 800 to 1200 grams/mole, a melting point of less than −60° C., a boiling point of more than 205° C., and a kinematic viscosity of 8 to 12 centiStokes, available under the trade designation MCR-A11 from Gelest, Incorporated Morrisville, PA (USA). |
| SILMER ACR DI-50 | Refers to a trade designation for a di-functional silicone acrylate polymer having a high molecular weight, a hydroxyl value of 7 (maximum), and a viscosity of 300 centiPoise, available from Siltech Corporation, Toronto, Ontario (Canada). |
| MQ resin | Refers to a silicone tackifying resin. It is a white powder that is the co-hydrolysis product of tetraalkoxy silane (Q unit) and trimethyl-ethoxy silane (M unit) the chemical structure of which is a three-dimensional network of polysilicic acid units that are endblocked with trimethylsilyl groups. The particular MQ resin used is available under the trade designation WACKER MQ 803 TF SILICONE RESIN POWDER from Wacker Chemical Corporation, Adrian, MI. It has some residual ethoxy and hydroxy functions present, with ratio of M to Q units of approximately 0.67, an average particle size of approximately 10 micrometers, and a hydroxyl content of no more than 0.30%. |
| Potassium isopropyl xanthate | A compound that is available from TCI America, Portland, OR (USA). |
| 2-Isocyanato ethyl methacrylate | A monomer that is available from Sigma Aldrich Corporation, St. Louis, MO (USA). |
| 3-Isopropenyl-alpha, alpha-dimethylbenzyl isocyanate | A compound that is available from Sigma Aldrich Corporation, St. Louis, MO (USA). The compound has a molecular weight of 201.3 grams/mole and a boiling point of 268-271° C. (based on literature). |
| Methyl dichloroacetate | A compound that is available from Sigma Aldrich Corporation, St. Louis, MO (USA). |
| 2-Ethylhexanol | A compound that is available from Sigma Aldrich Corporation, St. Louis, MO (USA). |
| Dimethylaminopyridine | A compound that is available from Sigma Aldrich Corporation, St. Louis, MO (USA). |
| Dichloroacetyl chloride | A compound that is available from Sigma Aldrich Corporation, St. Louis, MO (USA). |

Peel Adhesion Strength

Peel adhesion strength was measured at an angle of 180° using an IMASS SP-200 slip/peel tester (available from IMASS, Incorporated, Accord, Mass.) at a peel rate of 305 millimeters/minute (12 inches/minute). Stainless steel test panels measuring 25.4 centimeters by 12.7 centimeters (10 inches by 5 inches) were cleaned by wiping them with isopropanol using a lint-free tissue and allowing them to air dry for 30 minutes after which they were clamped to the test stage of the peel tester. Tape samples measuring approximately 1.3 centimeters by 20 centimeters (0.5 inches by 8 inches) were then applied to the cleaned test panels with the adhesive side in contact with the test panel. The tape samples were then rolled over using a 2.0-kilogram (4.5 pound) rubber roller one time in each direction. The taped panels were stored and tested at 23° C. and 50% relative humidity (RH). Testing was conducted between 1 and 8 hours after preparation. Three to five taped panels were evaluated and the average peel adhesion strength of the total number of panels tested was reported. Results were obtained in ounces/inch and converted to Newtons/decimeter (N/dm). In addition, it was noted if any adhesive residue remained on the stainless-steel panel after removal of the tape sample.

Shear Strength

Shear holding power (or static shear strength) was evaluated at 23° C. and 50% RH using a load of 500 grams. Stainless steel test panels, measuring 3.8 centimeters by 5.1 centimeters (1.5 inches by 2 inches), were cleaned as described above for the "Peel Adhesion Strength" test method. Tape samples measuring 1.27 centimeters by 15.2 centimeters (0.5 inch by 6 inches) were adhered to the test panels also as described above for the "Peel Adhesion Strength" test method. The tape was applied to one end of the test panel such that it covered an area of the panel measuring 1.27 centimeters by 2.54 centimeters (0.5 inches by 1 inch). The free end of the tape was folded over and adhered to itself such that there was no exposed adhesive. This free end was folded over and around a hanging hook and stapled together to secure the hook in place. The resulting taped test panel was hung vertically by a hole in the panel at the end opposite that having the tape. A weight of 500 grams was attached to the hook and the time for the tape to fall off the test panel was recorded. If the tape sample had not failed by 10,000 minutes the test was discontinued and the result recorded as 10,000+ minutes. Either two or three samples were evaluated and the average failure time reported. For those results shown as 10,000+ all samples gave the same result. For those that failed in less than 10,000 minutes the average failure time was reported. Samples that failed in less than 10,000 minutes were all observed to have failed via pop-off mechanism leaving little or no residue behind.

Tensile Strength and Elongation

Tensile strength and elongation at failure were measured according to ASTM D638-14 using a model MTS Alliance 100 Tensile Tester (MTS System Corporation, Eden Prairie, Minn.) and load cell capacity of 25.0 Newtons. Test specimens measuring 12 millimeters wide, 50 millimeters long, and having a thickness of approximately 0.025 centimeters were evaluated at strain rate of 25.4 centimeters/minute.

Two or three specimens were evaluated and the average tensile strength and elongation values were reported.

Percent Extractable Content

The amount of unreacted silicone material remaining in a silicone film after exposure to UV light was measured immediately after the film was irradiated follows. Three circular test specimens, each having a diameter of 3.69 centimeters and thickness of approximately 0.010 inch (0.025 centimeters), were cut from the film substrate across its width in an evenly spaced manner and were weighed to determine their initial weights. Next, the specimens were immersed in methyl isobutyl ketone (100 grams) for 24 hours, then removed using tweezer and allowed to air dry for about 12 hours. After drying, the final weights were determined. The change in weight was used to calculate a Weight Percent Extractable Content as follows:

[(Initial Weight−Final Weight)/Initial Weight]×100

The average of the three results was reported.

Preparation of Methyl-2,2-bis(isopropoxvycarbothioylsulfanyl)acetate (PI 1)

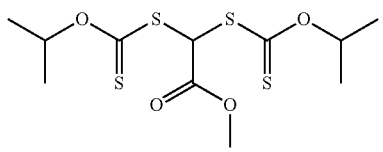 [SMILES: COC(=O)C(SC(=S)OC(C)C)SC(=S)OC(C)C]

A solution of methyl dichloroacetate (7.15 grams, 50.0 millimoles) dissolved in 250 milliliters of acetone was treated with potassium isopropyl xanthate (17.5 grams, 100 millmoles) and the reaction mixture was stirred overnight at room temperature. The reaction mixture was then filtered through a plug of silica gel in a small pipette, washed once with acetone, and the filtrate was concentrated down using a rotary evaporator to give a brown syrup. Purification by column chromatography (silica column using an eluent gradient of 18:82 (v:v)/methylene chloride:hexanes to 50:50 (v:v)/methylene chloride:hexanes) gave 11.5 grams of methyl-2, 2-bis(isopropoxycarbothioylsulfanyl) acetate, designated herein as PI 1, as an amber colored syrup. $^1$H NMR (CDCl3, 500 MHz): δ 6.03 (s, 1H), 5.73 (m, 2H), 3.82 (s, 3H), 1.42 (d, J=6.3 Hz, 6H), 1.40 (d, J=6.3, 6H).

Preparation of 2-ethlhexvl 2,2-dichloroacetate

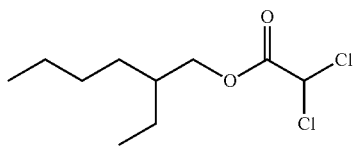

A solution of 2-ethylhexanol (3.00 grams, 23.0 mmol) in 50 mL of CH$_2$Cl$_2$ was cooled to 0° C. under nitrogen. To the solution were added trimethylamine (4.80 mL, 34.4 mmol) and dimethylaminopyridine (20 mg). This was followed by the dropwise addition of dichloroacetyl chloride (3.74 grams, 25.4 mmol). The reaction mixture was allowed to reach ambient temperature while stirring overnight. The reaction mixture was quenched with a saturated solution of NaHCO$_3$ followed by addition of 50 mL of CH$_2$Cl$_2$. The layers were separated and the organic portion was washed with 5 weight percent NaH$_2$PO$_4$ (2×) followed by brine. The organic portion was dried over Na$_2$SO$_4$, filtered through a small plug of silica gel, and concentrated under reduced pressure to yield 5.02 grams of 2-ethylhexyl 2,2-dichloroacetate as a yellow liquid.

Preparation of 2-Ethylhexyl 2,2-bis(isopropoxvcarbothiovlsulfanvl)acetate (PI 2)

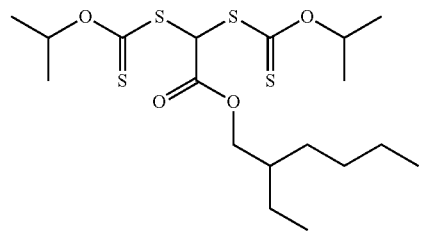 [SMILES: CCCCC(CC)COC(=O)C(SC(=S)OC(C)C)SC(=S)OC(C)C]

A solution of 2-ethylhexyl 2,2-dichloroacetate (7.14 grams, 29.6 millimoles) dissolved in 150 mL of acetone was treated with potassium isopropyl xanthate (10.3 grams, 59.3 millimoles) and the reaction mixture was stirred overnight at room temperature. The reaction mixture was filtered and washed once with acetone. The filtrate was concentrated down to give a brown syrup. Purification by column chromatography (silica gel, 100 volume percent hexanes to 40:60 (v:v)/methylene chloride:hexanes) gave 9.3 grams of 2-ethylhexyl 2,2-bis(isopropoxycarbothioylsulfanyl)acetate, designated herein as PI 2, as an amber colored liquid. $^1$H NMR (CDCl$_3$, 500 MHz) δ 6.05 (s, 1H), 5.73 (m, 2H), 4.10 (m, 2H), 1.61 (m, 1H), 1.42 (d, J=6.3 Hz, 6H), 1.40 (d, J=6.3, 6H), 1.37 (m, 2H), 1.34-1.26 (m, 6H), 0.89 (t, J=6.9, 3H), 0.89 (t, J=7.4, 3H).

Preparation of 1,1-bis(isopropoxvcarbothioylsulfanvl)methyl methyl ether (PI 3)

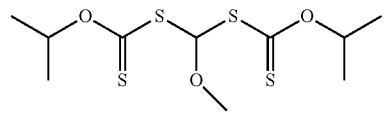 [SMILES: COC(SC(=S)OC(C)C)SC(=S)OC(C)C]

A mixture of SIX (7.57 grams, 48 millimoles) and acetone (30 milliliters) was cooled using an ice bath. A solution of dichloromethyl methyl ether (2.50 grams, 22 millimoles, TCI America, Portland, Oreg., USA) in acetone (5 milliliters) was added slowly over 15 minutes. After stirring at room temperature for three hours, the solvent was removed under vacuum. Ethyl acetate (30 milliliters) was added and the mixture was washed with water two times. The organic phase was concentrated under vacuum and the residual oil was purified by column chromatography over silica gel (1 to 15% ethyl acetate in hexanes). A yellow oil, 1,1-bis(isopropoxycarbothioylsulfanyl)methyl methyl ether designated herein as PI 3, was isolated (5.82 grams). Proton NMR gave the following results: 7.06 (s, 1H), 5.76 (m, 2H), 3.54 (s, 3H), 1.40-1.41 (m, 12H).

Preparation of Acrylamido Terminated Silicone (Silicone 1)

APTPDMS (100 grams) and vinyl azlactone (0.80 grams) were added together in a 200-gram glass jar and mixed on a rotating roller for 10 hours at the rate of 40 rolls/minute to yield 95 grams (95 percent yield) of acrylamido terminated silicone, designated herein as Silicone 1. Silicone 1 was prepared according to Reaction Scheme B above.

Preparation of Methacryloxy-Urea Terminated Silicone (Silicone 2)

APTPDMS (100 grams) and 2-isocyanato ethyl methacrylate (0.87 grams) were added together in a 200-gram glass jar and mixed on a rotating roller for 24 hours at the rate of 40 rolls/minute to yield 92 grams (92 percent yield) of methacryloxy-urea terminated silicone, designated herein as Silicone 2. Silicone 2 was prepared using Reaction Scheme C above.

Preparation of Methylstyryl-Urea Terminated Silicone (Silicone 3)

APTPDMS (100 grams) and 3-isopropenyl-alpha, alpha-dimethylbenzyl isocyanate (1.12 grams) were added together in a 200-gram glass jar and mixed on a rotating roller for 10 hours at the rate of 40 rolls/minute to yield 92 grams (92% yield) of methylstyryl urea terminated silicone, designated herein as Silicone 3. Silicone 3 was prepared using Reaction Scheme D above.

Preparation of Mono-Acrylamido Terminated Silicone (Silicone 4)

Mono-aminopropyl terminated polydimethylsiloxanes (100 grams) and vinyl azlactone (0.40 gram) were added together in a 200-gram glass jar and mixed on a rotating roller for 10 hours at the rate of 40 rolls/minute to yield 95 grams (95% yield) of mono-acrylamido terminated silicone, designated herein as Silicone 4.

Preparation of Silicone-Based Pressure-Sensitive Adhesives (Examples EX-1 to EX-8 and Comparative Examples CE-1 to CE-4)

Silicone-based pressure-sensitive adhesives were prepared by combining the materials and amounts shown in Table 1 in a glass jar with 5 grams of ethyl acetate and 10 grams of MQ resin to give a homogenous solution. The resulting compositions were coated onto the primed side of a 0.002 inch (51 micrometers) thick polyester film using a knife-over-bed coater between at an approximate wet thickness of 0.0.002 to 0.004 inch (51 to 203 micrometers) followed by drying in a forced air oven for two minutes at 110° C. (230° F.). The dried composition was then covered with a release liner having a fluorosilicone treatment on one side such that the treated side contacted the dried composition. The resulting article was then cured by UV irradiation using a UVP Black Ray Lamp Model XX-15L (from UVP, LLC, Upland, Calif.) having a maximum emission at 350 nanometers for between 20 and 25 minutes to provide a total energy of between 2000 and 2500 milliJoules/square centimeter. The resulting silicone-based pressure-sensitive adhesive tape articles were evaluated for peel adhesion strength and shear strength after removal of the release liner. The results are shown in Table 2.

TABLE 1

Compositions of EX-1 to EX-8 and CE-1 to CE-4

| Sample | Silicone 1 (grams) | Silicone 2 (grams) | Silicone 3 (grams) | Silicone 4 (grams) | SILMER ACR Di-50 (grams) | I651 (grams) | PI 1 (grams) | PI 2 (grams) | PI 3 (grams) |
|---|---|---|---|---|---|---|---|---|---|
| EX-1 | 8.5 | 0.0 | 0.0 | 1.5 | 0.0 | 0.000 | 0.100 | 0.000 | 0.000 |
| EX-2 | 8.5 | 0.0 | 0.0 | 1.5 | 0.0 | 0.000 | 0.000 | 0.100 | 0.000 |
| EX-3 | 8.5 | 0.0 | 0.0 | 1.5 | 0.0 | 0.000 | 0.000 | 0.000 | 0.100 |
| EX-4 | 10.0 | 0.0 | 0.0 | 0.0 | 0.0 | 0.000 | 0.100 | 0.000 | 0.000 |
| EX-5 | 0.0 | 8.5 | 0.0 | 1.5 | 0.0 | 0.000 | 0.100 | 0.000 | 0.000 |
| EX-6 | 0.0 | 0.0 | 8.5 | 1.5 | 0.0 | 0.000 | 0.100 | 0.000 | 0.000 |
| EX-7 | 0.0 | 0.0 | 0.0 | 2.5 | 7.5 | 0.000 | 0.100 | 0.000 | 0.000 |
| EX-8 | 8.5 | 0.0 | 0.0 | 1.5 | 0.0 | 0.010 | 0.100 | 0.000 | 0.000 |
| CE-1 | 8.5 | 0.0 | 0.0 | 1.5 | 0.0 | 0.100 | 0.000 | 0.000 | 0.000 |
| CE-2 | 2.5 | 0.0 | 0.0 | 7.5 | 0.0 | 0.100 | 0.000 | 0.000 | 0.000 |
| CE-3 | 0.0 | 0.0 | 0.0 | 2.5 | 7.5 | 0.100 | 0.000 | 0.000 | 0.000 |
| CE-4 | 10.0 | 0.0 | 0.0 | 0.0 | 0.0 | 0.100 | 0.000 | 0.000 | 0.000 |

TABLE 2

Adhesive Properties of EX-1 to EX-8 and CE-1 to CE-4

| Sample | Peel Adhesion Strength oz./in (N/dm) | Shear (minutes) |
|---|---|---|
| EX-1 | 34.2 (36.5) | 10000+ |
| EX-2 | 36.7 (39.3) | 10000+ |
| EX-3 | 38.5 (40.2) | 10000+ |
| EX-4 | 28.9 (31.8) | 5600 |
| EX-5 | 31.7 (34.9) | 10000+ |
| EX-6 | 28.3 (31.1) | 10000+ |
| EX-7 | 24.0 (26.4) | 10000+ |
| EX-8 | 34.5 (38.0) | 10000+ |
| CE-1 | 23.4 (25.7) | 3300 |
| CE-2 | 25.9 (28.5) | 2000 |
| CE-3 | 23.2 (25.5) | 4500 |
| CE-4 | 23.5 (25.9) | 1900 |

Preparation of Reference Silicone Films (Reference Comparative Example RCE-1 and Reference Examples REX-1 to REX-7)

Silicone materials and photoinitiators were added together in a glass jar and mixed on a rotating roller for 24 hours at the rate of 40 rolls/minute using the materials and amounts (in grams) shown in Table 1. The resulting compositions were coated between two sheets of 0.002 inch (51 micrometers) thick polyester film using a knife-over-bed coater to provide a coating thickness of approximately thickness of 0.10 inch (0.025 centimeters). The coatings were then cured by UV irradiation using a UVP Black Ray Lamp Model XX-15L (UVP, LLC, Upland, Calif., USA) having a maximum emission at 350 nanometers for between 20 and 25 minutes to provide a total energy of between 2000 and 2500 milliJoules/square centimeter. Free-standing silicone films were obtained after irradiation by removing the polyester films. These were evaluated as described above. The results are shown in Table 3.

TABLE 3

Compositions of Reference Examples REX-1 to REX-7 and Comparative Reference Example RCE-1

| Reference Example | Silicone 1 | Silicone 2 | Silicone 3 | PI 1 | PI 2 | PI 3 | I651 |
|---|---|---|---|---|---|---|---|
| RCE-1 | 10.0 | 0.0 | 0.0 | 0.000 | 0.000 | 0.000 | 0.128 |
| REX-1 | 10.0 | 0.0 | 0.0 | 0.160 | 0.000 | 0.000 | 0.000 |
| REX-2 | 10.0 | 0.0 | 0.0 | 0.160 | 0.000 | 0.000 | 0.012 |
| REX-3 | 10.0 | 0.0 | 0.0 | 0.160 | 0.000 | 0.000 | 0.128 |
| REX-4 | 10.0 | 0.0 | 0.0 | 0.000 | 0.16 | 0.000 | 0.000 |
| REX-5 | 10.0 | 0.0 | 0.0 | 0.000 | 0.000 | 0.160 | 0.000 |
| REX-6 | 0.0 | 10 | 0.0 | 0.160 | 0.000 | 0.000 | 0.000 |
| REX-7 | 0.0 | 0.0 | 10 | 0.160 | 0.000 | 0.000 | 0.000 |

TABLE 4

Results for RCE-1 and REX-1 to REX-7

| Reference Example | Tensile Strength (MegaPascals) | Tensile Elongation (%) | Extractable Content (%) |
|---|---|---|---|
| RCE-1 | 0.18 | 106 | 5 |
| REX-1 | 10.6 | 509 | 84 |
| REX-2 | 4.4 | 317 | 51 |
| REX-3 | 1.8 | 191 | 16 |
| REX-4 | 8.0 | 417 | 80 |
| REX-5 | 5.8 | 457 | 83 |
| REX-6 | 5.2 | 361 | 80 |
| REX-7 | 3.3 | 250 | 66 |

What is claimed is:

1. A silicone-based pressure-sensitive adhesive composition comprising a polymerized product of a reaction mixture comprising:

a) a silicone compound having at least two ethylenically unsaturated groups, the silicone compound being of Formula (I)

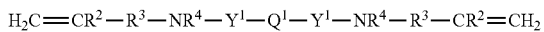

wherein
    $Q^1$ is a polydiorganosiloxane group;
    each $Y^1$ is an alkylene, arylene, aralkylene, or a combination thereof;
    each $R^2$ is a hydrogen or methyl;
    each $R^3$ is a single bond or is a divalent group that is a carbonyl, carbonylimino, carbonyloxy, imino, oxy, alkylene, alkylene substituted with a hydroxyl group, aralkylene, or a combination thereof; and
    each $R^4$ is hydrogen or an alkyl;

b) a photoinitiator of Formula (II)

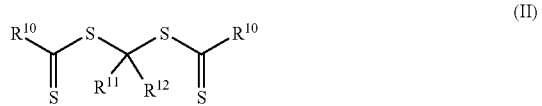

wherein
    each $R^{10}$ is an alkoxy, aryloxy, alkaryloxy, aralkyloxy, alkenoxy, or $N(R^{13})_2$;
    $R^{11}$ is a group of formula $(OR^{14})_p$—$OR^{15}$ or a group of formula —(CO)A-$R^{16}$;
    $R^{12}$ is a hydrogen, alkyl, aryl, aralkyl, alkaryl, a group of formula —(CO)O$R^{17}$, or a group of formula —(CO)N$(R^{18})_2$;
    each $R^{13}$ is an alkyl or two adjacent $R^{13}$ are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic;
    each $R^{14}$ is an alkylene;
    $R^{15}$ is an alkyl;
    $R^{16}$ is hydrogen, alkyl, aryl, aralkyl, or alkaryl;
    $R^{17}$ is an alkyl, aryl, aralkyl, or alkaryl;
    each $R^{18}$ is an alkyl, aryl, aralkyl, or alkaryl;
    X is oxy or —N$R^{19}$—;
    $R^{19}$ is hydrogen, alkyl, aryl, aralkyl, or alkaryl; and
    p is an integer equal to at least 0; and c) a silicone tackifying resin.

2. The silicone-based pressure-sensitive adhesive composition of claim 1, wherein the photoinitiator of Formula (II) is of Formula (II-1A) or Formula (II-1B)

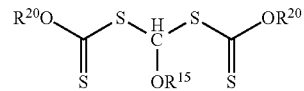

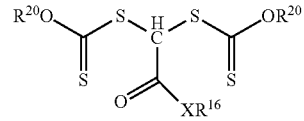

wherein
    each $R^{20}$ is an alkyl, aryl, alkaryl, aralkyl, or alkenyl;
    $R^{15}$ is an alkyl;
    $R^{16}$ is hydrogen, alkyl, aryl, aralkyl, or alkaryl;
    X is oxy or —N$R^{19}$—; and
    $R^{19}$ is hydrogen, alkyl, aryl, aralkyl, or alkaryl.

3. The silicone-based pressure-sensitive adhesive composition of claim 2, wherein the photoinitiator is of Formula (II-1A) and $R^{20}$ is an alkyl.

4. The silicone-based pressure-sensitive adhesive composition of claim 2, wherein the photoinitiator is of Formula (II-1B), $R^{20}$ is alkyl, $R^{16}$ is alkyl, X is oxy.

5. The silicone-based pressure-sensitive adhesive composition of claim 1, wherein the photoinitiator of Formula (II) is of Formula (II-2A) or Formula (II-2B)

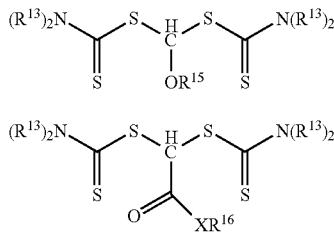

wherein
each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic;
$R^{15}$ is an alkyl;
$R^{16}$ is hydrogen, alkyl, aryl, aralkyl, or alkaryl;
X is oxy or —$NR^{19}$—; and
$R^{19}$ is hydrogen, alkyl, aryl, aralkyl, or alkaryl.

6. The silicone-based pressure-sensitive adhesive composition of claim 5, wherein the photoinitiator is of Formula (II-2A) and each $R^{13}$ is an alkyl.

7. The silicone-based pressure-sensitive adhesive composition of claim 5, wherein the photoinitiator is of Formula (II-2B), each $R^{13}$ is alkyl, X is oxy, and $R^{16}$ is alkyl.

8. The silicone-based pressure-sensitive adhesive composition of claim 1, wherein the reaction mixture further comprises a silicone compound having a single ethylenically unsaturated group.

9. The silicone-based pressure-sensitive adhesive composition of claim 1, wherein the reaction mixtures comprise 30 to 80 weight percent of the silicone compound of Formula (I), 0.001 to 5 weight percent of the photoinitiator of Formula (II), and 20 to 65 weight percent silicone tackifying resin.

10. The silicone-based pressure-sensitive adhesive composition of claim 1, wherein the reaction mixture optionally further comprises 0 to 25 weight percent of a silicone compound of Formula (I) and/or 0 to 20 weight percent of a filler based on the total weight of solids in the reaction mixture.

11. The silicone-based pressure-sensitive adhesive composition of claim 1, wherein the polymerized product comprises a mixture of a silicone-based elastomeric material and the silicone tackifying resin.

12. An article comprising a silicone-based pressure-sensitive adhesive composition of claim 1 and a substrate, wherein the silicone-based pressure-sensitive adhesive is positioned adjacent to the substrate.

13. A method of making a silicone-based pressure-sensitive adhesive comprising a silicone-based elastomeric material and a silicone tackifying resin, the method comprising:

forming reaction mixture comprising
a) a silicone compound having at least two ethylenically unsaturated groups, the silicone compound being of Formula (I)

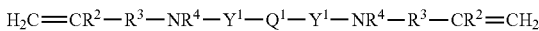

wherein
$Q^1$ is a polydiorganosiloxane group;
each $Y^1$ is an alkylene, arylene, aralkylene, or a combination thereof;
each $R^2$ is a hydrogen or methyl;
each $R^3$ is a single bond or is a divalent group that is a carbonyl, carbonylimino, carbonyloxy, imino, oxy, alkylene, alkylene substituted with a hydroxyl group, aralkylene, or a combination thereof, and
each $R^4$ is hydrogen or an alkyl;
b) a photoinitiator of Formula (II)

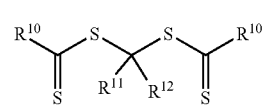

wherein
each $R^{10}$ is an alkoxy, aryloxy, alkaryloxy, aralkyloxy, alkenoxy, or —$N(R^{13})_2$;
$R^{11}$ is a group of formula —$(OR^{14})_p$—$OR^{15}$ or a group of formula —(CO)—X—$R^{16}$;
$R^{12}$ is a hydrogen, alkyl, aryl, aralkyl, alkaryl, a group of formula —(Co)$OR^{17}$, or a group of formula —(CO)N$(R^{18})_2$;
each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic;
each $R^{14}$ is an alkylene;
$R^{15}$ is an alkyl;
$R^{16}$ is hydrogen, alkyl, aryl, aralkyl, or alkaryl;
$R^{17}$ is an alkyl, aryl, aralkyl, or alkaryl;
each $R^{18}$ is an alkyl, aryl, aralkyl, or alkaryl;
X is oxy or —$NR^{19}$—;
$R^{19}$ is hydrogen, alkyl, aryl, aralkyl, or alkaryl; and
p is an integer equal to at least 0; and
c) a silicone tackifying resin; and
exposing the reaction mixture to actinic radiation to form the silicon-based elastomeric material.

14. The method of claim 12, wherein the actinic radiation is ultraviolet radiation.

* * * * *

UNITED STATES PATENT AND TRADEMARK OFFICE
CERTIFICATE OF CORRECTION

PATENT NO. : 10,822,532 B2
APPLICATION NO. : 16/643656
DATED : November 3, 2020
INVENTOR(S) : Jitendra Rathore It is certified that error appears in the above-identified patent and that said Letters Patent is hereby corrected as shown below:

In the Specification

Column 5
Line 56, After "Formula" insert -- (I). --.

Column 8
Line 9, Delete "(CO)=CH" and insert -- (CO)—CH --, therefor.

Column 11
Line 62, Delete "thereof," and insert -- thereof; --, therefor.

Column 12
Line 54, Delete "—N($R^3$)$_2$." and insert -- —N($R^{13}$)$_2$. --, therefor.
Line 55, Delete "—(O$R^4$)$_p$—O$R^{15}$" and insert -- —(O$R^{14}$)$_p$—O$R^{15}$ --, therefor.
Line 57, Delete "—(CO)—X—$R^6$." and insert -- —(CO)—X—$R^{16}$. --, therefor.
Line 58, Delete "—(CO)O$R^7$," and insert -- —(CO)O$R^{17}$, --, therefor.
Line 67, Delete "$R^7$" and insert -- $R^{17}$ --, therefor.

Column 13
Line 4, Delete "$R^{0}$" and insert -- $R^{10}$ --, therefor.

Column 15
Line 20, Delete "—O$R^5$." and insert -- —O$R^{15}$. --, therefor.
Line 21, Delete "—O$R^{15}$" and insert -- —O$R^{15}$. --, therefor.

Column 16
Line 67, Delete "—(O$R^4$)$_p$—O$R^{15}$" and insert -- —(O$R^{14}$)$_p$—O$R^{15}$ --, therefor.

Column 17
Line 1, Delete "—(CO)O$R^7$" and insert -- —(CO)O$R^{17}$ --, therefor.

Signed and Sealed this
Second Day of February, 2021

Drew Hirshfeld
*Performing the Functions and Duties of the
Under Secretary of Commerce for Intellectual Property and
Director of the United States Patent and Trademark Office*

Line 5, Delete "—(OR$^4$)$_p$—OR$^{15}$" and insert -- —(OR$^{14}$)$_p$—OR$^{15}$ --, therefor.

Column 18
Line 8, Delete "R$^3$" and insert -- R$^{13}$ --, therefor.

Column 26
Line 23, Delete "—(OR$^4$)$_p$—OR$^{15}$" and insert -- —(OR$^{14}$)$_p$—OR$^{15}$ --, therefor.
Line 52, Delete "thereof," and insert -- thereof; --, therefor.

Column 33
Line 21-22, Delete "bis(isopropoxvycarbothioylsulfanyl)acetate" and insert
-- bis(isopropoxycarbothioylsulfanyl)acetate --, therefor.
Line 48, Delete "2-ethlhexvl" and insert -- 2-ethylhexyl --, therefor.

Column 34
Line 10, Delete "2,2-bis(isopropoxvcarbothiovlsulfanvl)acetate" and insert -- 2,2-bis(isopropoxycarbothioylsulfanyl)acetate --, therefor.
Line 42, Delete "1,1-bis(isopropoxvcarbothioylsulfanvl)methyl" and insert -- 1,1-bis(isopropoxycarbothioylsulfanyl)methyl --, therefor.

In the Claims

Column 38
Line 3, In Claim 1, delete "N(R$^{13}$)$_2$;" and insert -- —N(R$^{13}$)$_2$; --, therefor.
Line 4, In Claim 1, delete "(OR$^{14}$)$_p$—OR$^{15}$" and insert -- —(OR$^{14}$)$_p$—OR$^{15}$ --, therefor.
Line 5, In Claim 1, delete "—(CO)A—R$^{16}$;" and insert -- —(CO)—X—R$^{16}$; --, therefor.
Line 25, In Claim 1, before "are" insert -- groups --.

Column 40
Line 20, In Claim 13, delete "thereof," and insert -- thereof; --, therefor.
Line 37, In Claim 13, delete "—(Co)OR$^{17}$," and insert -- —(CO)OR$^{17}$, --, therefor.